(12) United States Patent
Pippin

(10) Patent No.: US 6,496,141 B2
(45) Date of Patent: *Dec. 17, 2002

(54) HYBRID SYSTEM AND METHOD FOR GOLF COURSE DISTANCE DETERMINATION USING GPS NAVIGATION SIGNALS

(75) Inventor: John Festus Pippin, Alpharetta, GA (US)

(73) Assignee: VXT, L.L.C., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/880,418

(22) Filed: Jun. 13, 2001

(65) Prior Publication Data

US 2002/0027524 A1 Mar. 7, 2002

Related U.S. Application Data

(63) Continuation of application No. 09/406,894, filed on Sep. 28, 1999, now Pat. No. 6,278,402.
(60) Provisional application No. 60/102,060, filed on Sep. 28, 1998.
(51) Int. Cl.⁷ ................................................. G01S 5/14
(52) U.S. Cl. .............................. 342/357.08; 342/357.03
(58) Field of Search ....................... 342/357.08, 357.03, 342/358

(56) References Cited

U.S. PATENT DOCUMENTS 5,878,369 A * 3/1999 Rudow et al. ......... 342/357.08

6,278,402 B1 * 8/2001 Pippin .................. 342/357.03

* cited by examiner

Primary Examiner—Thomas H. Tarcza
Assistant Examiner—Fred H Mull
(74) Attorney, Agent, or Firm—Morris, Manning & Martin, LLP

(57) ABSTRACT

A system using GPS navigation signals to aid in distance determination on a golf course includes a cart-based unit, a hand-held distance determining unit that can be interconnected with the cart-based unit, and a central base station. The central base station includes an RF transceiver for wireless communications and a controller. The hand-held distance determining unit includes a GPS receiver, a display, memory for storing golf course location data, and a controller. The cart-based unit includes an RF transceiver, a display, and a connector cradle into which the hand-held unit can be inserted in order to share information with the cart-based unit. With the hybrid system of the invention, the benefits of the fill features, large display screen and rich functionality of a cart-mounted GPS-based distance determining system are provided along with the benefits of a small, inexpensive, portable hand-held unit that a golfer can use away from the golf cart, such as in "cart path only" situations. The system provides improved accuracy either through use of differential GPS techniques or through use of WAAS satellite GPS correction signals. The invention also provides a method of determining distances on a golf course including the steps of inserting a hand-held distance determining unit in a connector cradle in a cart-based unit and relaying information between the hand-held unit and the cart-based unit. The method further includes the step of transmitting GPS correction data from a central base station to golfers on the golf course.

46 Claims, 10 Drawing Sheets

HYBRID SYSTEM AND METHOD FOR GOLF COURSE DISTANCE DETERMINATION USING GPS NAVIGATION SIGNALS

CROSS-REFERENCE TO RELATED APPLICATIONS

This application is a continuation of application Ser. No. 09/406,894, filed Sep. 28, 1999, now U.S. Pat. No. 6,278, 402, which hereby claims the benefit under 35 U.S.C. Sec. 119(e) of United States provisional Patent Application Serial No. 60/102,060, filed Sep. 28, 1998, entitled Mobile Distance (sic) Detachable Hand-Held Distance Unit For A Golf Course, and assigned to the same assignee as the present invention.

FIELD OF THE INVENTION

The present invention relates to systems for determining distances on golf courses, and more particularly to systems that determine golf course distances using Global Positioning System navigation signals.

BACKGROUND OF THE INVENTION

The popularity of the game of golf has increased significantly over the past few decades, and the sport is now a major leisure time activity. Hitting a good golf shot (and thus achieving a good golf score) requires that the golfer know with some accuracy the distance the golfer needs to hit the golf ball. Off the tee, for example, the distance required in order to clear a fairway bunker or a water hazard is often a concern. When approaching the green, the distance to the pin or the distance to the front or back of the green must be known in order to enable proper club selection. In summary, then, golfers need to know where their ball lies relative to various points of interest on the golf course, including the pin, the front or back of the green, sand traps, trees, creeks, lakes, and other points of interest.

Various methods for determining the distance to golf course points of interest have been developed. These methods include techniques as simple as walking off the distance between the ball and the point of interest, referring to rough distance markers along the fairway (such as sprinkler heads or 150-yard-markers) and guessing based on vision. While these simple techniques have served golfers for centuries, other more technologically advanced systems have more recently been devised. More advanced systems include the use of binoculars with built-in laser range-finding devices and the use of electronic point identifier units. With the binocular-laser systems, the binoculars include a distance unit that enables a golfer to locate an object. When activated, the distance unit on the binoculars sends a laser signal to the object and the distance between the golfer and the object can be determined by evaluating the laser reflection. With the point identifier units, a stationary electronic unit may be placed on a point of interest, such as a flag pole, and when the golfer directs a point identifier unit towards the pin, the unit transmits a signal to the stationary electronic unit and determines the distance between the point identifier unit and the golfer unit. While each of these systems can be used to determine the distance to a golf pin or other point of interest, these systems have disadvantages. To overcome some of these disadvantages, range finders based on Global Positioning System ("GPS") receivers have been developed.

The United States Department of Defense developed and maintains a constellation of earth-orbiting satellites known as the Global Positioning System to provide radionavigation aids to commercial and military users. The satellite constellation consists of 24 satellites configured in six orbital planes. Radio transmissions from the satellites are referenced to very accurate atomic frequency standards aboard the satellites, which are, in turn synchronized with a system-wide GPS system time base. The system provides accurate, continuous, worldwide, three-dimensional position and velocity information to users with appropriate receiving equipment. A number of standard GPS receivers have been developed for use in aircraft, boats, automobiles and other vehicles, and positioning receivers that use the GPS system have been widely deployed around the world.

The GPS satellites broadcast a pseudo-random-noise code ("PRN code") and navigation data modulated on two carrier frequencies via a spread-spectrum technique called Code Division Multiple Access ("CDMA"). All satellites transmit signals with the same two frequencies, but each satellite uses a PRN code that is relatively orthogonal, and hence uncorrelated, with respect to the CDMA codes used by other satellites in the constellation. Navigation data transmitted by each satellite allows receivers to determine the location of the transmitting satellite at the time of transmission, while the PRN code allows receivers to determine which satellite transmitted the signal. The transit time of each signal, and hence the satellite-to-receiver range and the position of the receiver, can be determined once the signals from multiple satellites have been distinguished.

GPS provides service enabling positioning accuracy of about 100 meters to any user worldwide. However, U.S military users can access the GPS "precision" service that provides considerably more accuracy if they have keys to an encrypted dithering of the satellite clock. In addition, all users can use "differential" techniques to obtain far greater position accuracy, such as by removing correlated errors between two or more receivers when the location of one receiver is very precisely known beforehand.

The most common method of calculating position using the GPS satellites is to measure the receiver's distance (or "range") from at least four GPS satellites in known locations, and to triangulate the receiver's position therefrom. The range from the receiver to each satellite is measured indirectly by measuring the time for the radio signal transmitted by each satellite to travel through space to the receiver.

This time measurement is made through the use of the PRN code generated by each satellite and transmitted at a precisely determined interval of GPS time that is common to all the satellites Standard GPS receivers are equipped to generate internally an exact duplicate of the unique code transmitted by each satellite. The receiver "tracks" or "locks on" to a particular satellite by matching or correlating the internally generated code assigned to a particular satellite to the code received as part of the signal transmitted by that satellite. Since some amount of time is required for the coded signal to travel at the speed of light from the satellite to the receiver, the receiver must delay the generation of the internally generated code in order to match the internally generated code to, the code being received. By measuring the amount of time by which the internally generated code must be delayed in order to match the coded signal received from the satellite, the receiver is indirectly measuring the time required for the signal to travel from the satellite to the receiver. Multiplying the time required to travel from the satellite to the receiver by the speed at which the radio signal is traveling (the speed of light), the user can determine the "range" or distance to the satellite.

A GPS receiver at a known (i.e., surveyed) location can be used to provide correlated error corrections which can then be transmitted to other nearby receivers to enable more accurate position determination. These receivers use these error corrections in combination with their GPS-derived apparent position data to produce a more accurate differential GPS (DGPS) position correction. DGPS techniques are frequently implemented to achieve a higher degree of accuracy than possible with absolute (single receiver) measurements. When both the base station units and mobile units are within a few miles of each other, DGPS can remove common-mode errors that affect absolute single receiver measurements. These common-mode errors include selective availability (SA) and bias errors, such as satellite clock errors, ephemeris data errors and tropospheric delay effects. DGPS does not correct errors due to multi-path or noise detected at the receiver.

In a typical DGPS-based golf range-finding system, the location of a golfer or mobile unit associated with the golfer may be determined using a standard GPS receiver. Many of these range-finding systems include a fixed, central base station at the golf course clubhouse and numerous mobile units that are either mounted on golf carts or carried by the golfer. Mobile units typically include both a GPS receiver for position determination and a radio communications transceiver for communicating with the central base station. The mobile units typically store a database of records that include the locations of various points of interest on the golf course. The base station unit calculates its GPS position from the signals and compares the calculated position signal to the known fixed location of the base station to compute a differential position correction. These differential position corrections are transmitted to the mobile units to enable the mobile units to correct for correlated positioning errors and to thereby determine a more accurate position estimate than would otherwise be possible with an uncorrected GPS position reading.

While using GPS- and DGPS-based golf ranging systems to provide position estimates to conventional mobile distance units operated by golfers is useful, pin changes and the associated updates must be completed before the golfer begins the round so that the mobile unit can be updated with the correct positions. Because the pin positions on a golf course are routinely changed in the morning after some golfers begin to play, the mobile units operated by the golfers may not have the most recent pin positions information. In other GPS mobile distance systems for golf courses, the pin positions are determined by basing distance calculations on a pre-determined daily pin area position. With the day of week identified, the distance to the pin position area for the day of the week can be determined. However, these estimates may not be as accurate as a golfer would like. Furthermore, although DGPS systems are accurate, some golfers, particularly expert golfers, prefer that the system yield a better margin of error than these systems typically provide.

In order to provide a more accurate GPS-based position determining system for critical aircraft traffic control and automated landing systems, the U.S. Federal Aviation Administration is developing the Wide Area Augmentation System (WAAS). The WAAS improves the accuracy capability of a GPS-based positioning system in much the same way that a ground-based DGPS system does. WAAS is based on a network of approximately 25 ground reference stations that covers a very large service area in North America Signals from GPS satellites are received by wide area ground reference stations (WRSs). Each of these precisely surveyed reference stations receives GPS signals and determines a correction signal required to correct for errors in the GPS-derived position at that point These WRSs are linked to form the U.S. WAAS network. Each WRS in the network relays the data to the wide area master station (WMS) where correction information is computed. The WMS calculates correction algorithms and assesses the integrity of the system. A correction message is prepared and uplinked to a geostationary communications satellite The WAAS correction message is then broadcast by the geostationary satellite at the same frequency that the GPS satellites transmit the GPS navigation code. (1575.42 MHz) to WAAS-equipped receivers onboard aircraft or on the ground that are within the broadcast coverage area of the WAAS. Because the WAAS signal is broadcast at the GPS navigation signal frequency, standard GPS receivers can be easily modified to receive and decode the WAAS correction message and to thereby enable more accurate position determination than is possible using GPS alone. It is expected that in the near future many GPS receivers will be equipped with built-in WAAS capability.

Conventional GPS-based golf range-finding systems suffer from a number of practical limitations, unfortunately. Golf courses increasingly require that golfers refrain from driving their golf carts into the fairway and that the carts instead remain on the asphalt or concrete "cart paths" that extend from tee to green on one side of a typical golf hole. Such "cart path only" rules help maintain the quality of the turf in the fairway, particularly after a rain when the ground is soft. GPS-based range-finding systems that are mounted in the cart are thus of little use if the cart cannot be driven to the golfer's ball. Portable GPS-based range-finders that can be carried by the golfer to the ball have been developed to solve the "cart path only" problem and to service golfers who walk the course rather than ride in a cart. In order to take advantage of real-time DGPS or WAAS position correction systems, communications links to a central base station, and the availability of large display screens for displaying course detail and other rich information, however, these portable units typically must include an RF transceiver, significant battery storage, and a large display screen in addition to a GPS receiver and distance determination capability and are thus large, heavy and more expensive.

Unfortunately, conventional GPS-based golf range-finding systems thus require a performance and cost trade-off. If the system is cart-mounted, full features, a large display screen, and rich functionality can be provided, but the system is not useful in "cart path only"situations or when the golfer otherwise leaves the golf cart. If, on the other hand, a portable unit is desired, features and functionality must conventionally be sacrificed in order to minimize size, weight, power consumption, and cost.

SUMMARY OF THE INVENTION

A GPS-based position determining system for use on a golf course is provided that combines the benefits of the full features, large display screen, and rich functionality that are available with a cart-mounted GPS-based system and the benefits of the portability, small size, low power consumption, and low cost of a hand-held unit. The hand-held unit can be interconnected with a cart-based unit when it is inserted into a connector cradle in the cart-based unit, and the two units can thereby exchange GPS correction signals, WAAS correction data, location and distance information, paging information, and other information. The performance and cost trade-offs by which conventional systems for GPS-based golf course position determination are constrained are thus avoided.

According to one embodiment, the invention provides a system for receiving position data from GPS satellites and for determining distances to a plurality of selected points of interest on a golf course. The system includes a central base station unit that comprises a base station RF transceiver adapted to communicate via a wireless communications link and a base station controller adapted to control the base station RF transceiver. The system further includes a hand-held unit that comprises a hand-held unit GPS receiver adapted to receive and process navigation signals from GPS satellites and to thereby provide GPS-derived hand-held unit location data, a hand-held unit display for displaying graphics, distance information, location information, and other information to users of the system, a hand-held unit memory for storing a plurality of stored location data, and a hand-held unit controller adapted to control the hand-held unit GPS receiver, the hand-held unit display, and the hand-held unit memory. According to the invention, the hand-held unit is still further adapted to calculate a distance between the hand-held unit and a point of interest on the golf course by comparing the hand-held unit location information with the stored location data for the selected point of interest. The system still further includes a cart-based unit that comprises a cart-based unit battery, a cart-based unit RF transceiver to communicate with the base station RF transceiver via the wireless communications link, and a cart-based unit display for displaying graphics, distance information, location information, and other information to users of the system. The cart-based unit further comprises a connector cradle for holding the hand-held unit. The connector cradle includes a battery connector adapted to electrically connect the cart-based unit battery to the connector cradle, a hand-held unit connector adapted to electrically interconnect the cart-based unit and the hand-held unit when the hand-held unit is received in the connector cradle, and a DC power connector for providing energy from the cart-based unit battery through the connector cradle to the hand-held unit. The cart-based unit still further comprises a cart-based unit controller adapted to control the cart-based unit RF transceiver, the cart-based unit display, and communications between the cart-based unit and the hand-held unit via the connector cradle. According to this embodiment, the cart-based unit is adapted to receive the hand-held unit location information via the connector cradle, the hand-held unit is adapted to electrically interconnect the hand-held unit to the cart-based unit via the connector cradle for providing the hand-held unit location information to the cart-based unit, and the base station controller is adapted to manage communication between the central base station unit and the cart-based unit.

According to one embodiment of the invention that uses differential GPS technology, the base station unit further comprises a base station GPS receiver and a base station processor adapted to generate a GPS correction signal that is a function of the difference between a known base station location and the GPS-derived base station location. In this system, the cart-based unit is preferably adapted to receive the GPS correction signal transmitted from the base station unit via the cart-based unit RF transceiver and to provide the GPS correction signal to the hand-held unit via the connector cradle. The hand-held unit preferably generates hand-held unit location information from a combination of the GPS-derived hand-held unit location data and the GPS correction signal.

According to another embodiment of the invention that uses WAAS satellite correction signals to compensate for GPS system inaccuracies, the base station unit further comprises a base station WAAS receiver adapted to receive a WAAS correction signal and a base station processor adapted to determine WAAS correction data from the WAAS correction signal. In this system, the cart-based unit is preferably adapted to receive the WAAS correction data from the base station unit via the cart-based unit RF transceiver and to provide the WAAS correction data to the hand-held unit via the connector cradle. The hand-held unit preferably generates hand-held unit location information from a combination of the GPS-derived hand-held unit location data and the WAAS correction data. In still another embodiment that uses WAAS satellite correction signals, the hand-held unit GPS receiver is adapted to receive WAAS correction signals and the hand-held unit is adapted to generate hand-held unit location information from a combination of the GPS-derived hand-held unit location data and the WAAS correction data.

According to another advantageous embodiment, the invention provides a hand-held distant determining unit for use in a system based on differential GPS technology for determining distances to a plurality of user selected points of interest on a golf course. In this embodiment, the hand-held distance determining unit includes a hand-held unit GPS receiver adapted to receive and process navigation signals from GPS satellites and to thereby provide GPS-derived hand-held unit location data, a hand-held unit display for displaying graphics, distance information, location information, and other information to a user of the system, a hand-held unit memory for storing a plurality of stored location data for the respective ones of the points of interest on the golf course, and a hand-held unit controller adapted to control the hand-held unit GPS receiver, the hand-held unit display, and the hand-held unit memory. According to this embodiment, the hand-held unit controller is adapted to generate hand-held distance determining unit location information from a combination of the GPS-derived hand-held unit location data and the GPS correction signal. The hand-held unit is adapted to calculate a distance between the hand-held distance determining unit and a selected one of the points of interest on the golf course by comparing the hand-held distance determining unit location information with the stored location data for that respective point of interest, and the hand-held distance determining unit is further adapted to electrically interconnect the hand-held distance determining unit to the cart-based unit via the connector cradle for providing the hand-held distance determining unit location information to the cart-based unit and for receiving the GPS correction signal from the cart-based unit. In one advantageous embodiment, the hand-held unit is adapted to receive a paging message and other information from the central base station through a hand-held unit RF transceiver.

According to yet another advantageous embodiment, the invention provides a hand-held distance determining unit for use in a system based on WAAS correction signal technology for determining distances to a plurality of user selected points of interest on a golf course. In this embodiment, the hand-held distance determining unit includes a hand-held unit GPS receiver adapted to receive and process navigation signals from GPS satellites and to thereby provide GPS-derived hand-held unit location data, a hand-held unit display for displaying graphics, distance information, location information, and other information to a user of the system, a hand-held unit memory for storing a plurality of stored location data for the respective ones of the points of interest on the golf course, and a hand-held unit controller adapted to control the hand-held unit GPS receiver, the hand-held unit display, and the hand-held unit memory. According to this embodiment, the hand-held unit controller is adapted to generate hand-held distance determining unit location information from a combination of the GPS-derived hand-held unit location data and WAAS correction data. The hand-held unit is adapted to calculate a distance between the hand-held distance determining unit and a selected one of the points of interest on the golf course by comparing the hand-held distance determining unit location information with the stored location data for that respective point of interest, and the hand-held distance determining unit is further adapted to electrically interconnect the hand-held distance determining unit to the cart-based unit via the connector cradle for providing the hand-held distance determining unit location information to the cart-based unit and for receiving the GPS correction signal from the cart-based unit. In one advantageous embodiment, the hand-held unit is adapted to electrically interconnect the hand-held distance determining unit to the cart-based unit via the connector cradle for receiving information from the cart-based unit, the cart-based unit being adapted to receive the information from the central base station unit via the cart-based unit RF transceiver and to provide the information to the hand-held unit via the connector cradle.

According to another advantageous embodiment, a hand-held distance determining unit for use in a system for determining distances to a plurality of user selected points of interest on a golf course is provided. According to this embodiment, the hand-held distance determining unit includes a hand-held unit GPS receiver adapted to receive and process navigation signals from GPS satellites and to thereby provide GPS-derived hand-held unit location data, the hand-held unit GPS receiver being further adapted to receive and process a WAAS correction signal and to generate a WAAS correction data, a hand-held unit display for displaying graphics, distance information, location information, and other information to a user of the system, a hand-held unit memory for storing a plurality of stored location data for the respective ones of the points of interest on the golf course, and a hand-held unit controller adapted to control the hand-held unit GPS receiver, the hand-held unit display, and the hand-held unit memory. According to the invention, the hand-held unit controller is adapted to generate hand-held distance determining unit location information from a combination of the GPS-derived hand-held unit location data and the WAAS correction data, and the hand-held unit is adapted to calculate a distance between the hand-held distance determining unit and a selected one of the points of interest on the golf course by comparing the hand-held distance determining unit location information with the stored location data for that respective point of interest.

A method of determining distances to a plurality of selected points of interest on a golf course using GPS satellite position signals is also provided that is based on differential GPS techniques. According to this embodiment, the method includes the steps of determining an absolute location of a central base station relative to a fixed coordinate system, receiving at the base station a first set of navigation signals from the GPS satellites, determining a GPS-derived base station location relative to the fixed coordinate system from the first set of navigation signals, calculating a GPS correction signal that is a function of the difference between the absolute location of the central base station and the GPS-derived base station location, transmitting the GPS correction signal to a cart-based unit, inserting in the cart-based unit a hand-held unit having a hand-held unit display into a connector cradle that provides an electrical interconnection between the cart-based unit and the hand-held unit, relaying the GPS correction signal from the cart-based unit to the hand-held unit, storing a plurality of stored location data associated with the selected points of interest on the golf course, receiving in the hand-held unit a second set of navigation signals from the GPS satellites, determining a GPS-derived hand-held unit location relative to the fixed coordinate system from the second set of navigation signals, calculating a corrected hand-held unit location relative to the fixed coordinate system from a combination of the GPS-derived hand-held unit location and the GPS correction signal, determining a distance data between the hand-held unit and a first point of interest on the golf course by comparing the corrected hand-held unit location with the stored location data associated with the first point of interest, and displaying the distance data. on the hand-held unit display In one embodiment, the method further includes the steps of relaying the distance data from the hand-held unit to the cart-based unit through the connector cradle and displaying the distance data on a cart-based unit display.

A method of determining distances to a plurality of selected points of interest on a golf course using GPS satellite position signals is also provided that is based on transmitting WAAS correction signals from a central base station. According to this embodiment, the method includes the. steps of receiving at a central base station a WAAS correction signal from a WAAS broadcaster, calculating a WAAS correction data from the WAAS correction signal transmitting the WAAS correction data to a cart-based unit, inserting a hand-held unit having a hand-held unit display into a connector cradle in the cart-based unit that provides an electrical interconnection between the cart-based unit and the hand-held unit, relaying the WAAS correction data from the cart-based unit to the hand-held unit, storing a plurality of stored location data associated with the selected points of interest on the golf course, receiving in the hand-held unit a set of navigation signals from the GPS satellites, determining a GPS-derived hand-held unit location relative to a fixed coordinate system from the set of navigation signals, Calculating a corrected hand-held unit location relative to the fixed coordinate system from a combination of the GPS-derived hand-held unit location and the WAAS correction data, determining a distance data between the hand-held unit and a first point of interest on the golf course by comparing the corrected hand-held unit location with the stored location data associated with the first point of interest, and displaying the distance data on the hand-held unit display.

A method of determining distances to a plurality of selected points of interest on a golf course using GPS satellite position signals is also provided that is based on receiving WAAS satellite correction signals directly at a hand-held unit. According to this embodiment, the method includes the steps of receiving a WAAS correction signal from a WAAS broadcaster, calculating a WAAS correction data from the WAAS correction signal, storing a plurality of stored location data associated with the selected points of interest on the golf course, receiving a set of navigation signals from the GPS satellites, determining a GPS-derived hand-held unit location relative to a fixed coordinate system from the set of navigation signals, calculating a corrected hand-held unit location relative to the fixed coordinate system from a combination of the GPS-derived hand-held unit location and the WAAS correction data, determining a distance data between the hand-held unit and a first point of interest on the golf course by comparing the corrected hand-held unit location with the stored location data associated with the first point of interest, and displaying the distance data on the hand-held unit display.

The system and method of the present invention thus advantageously combine the benefits of a cart-mounted GPS-based system and method for distance determination with the benefits of a portable, small, low power, low cost GPS-based hand-held unit. The hybrid system features a hand-held unit that can be interconnected with a cart-based unit when it is inserted into a connector cradle in the cart-based unit, and the two units can thereby exchange GPS correction signals, WAAS correction data, location and distance information, paging information, and/or other information. The performance and cost trade-offs by which conventional systems for GPS-based golf course position determination are typically constrained are thus avoided.

DETAILED DESCRIPTION OF THE INVENTION

Figure 1:
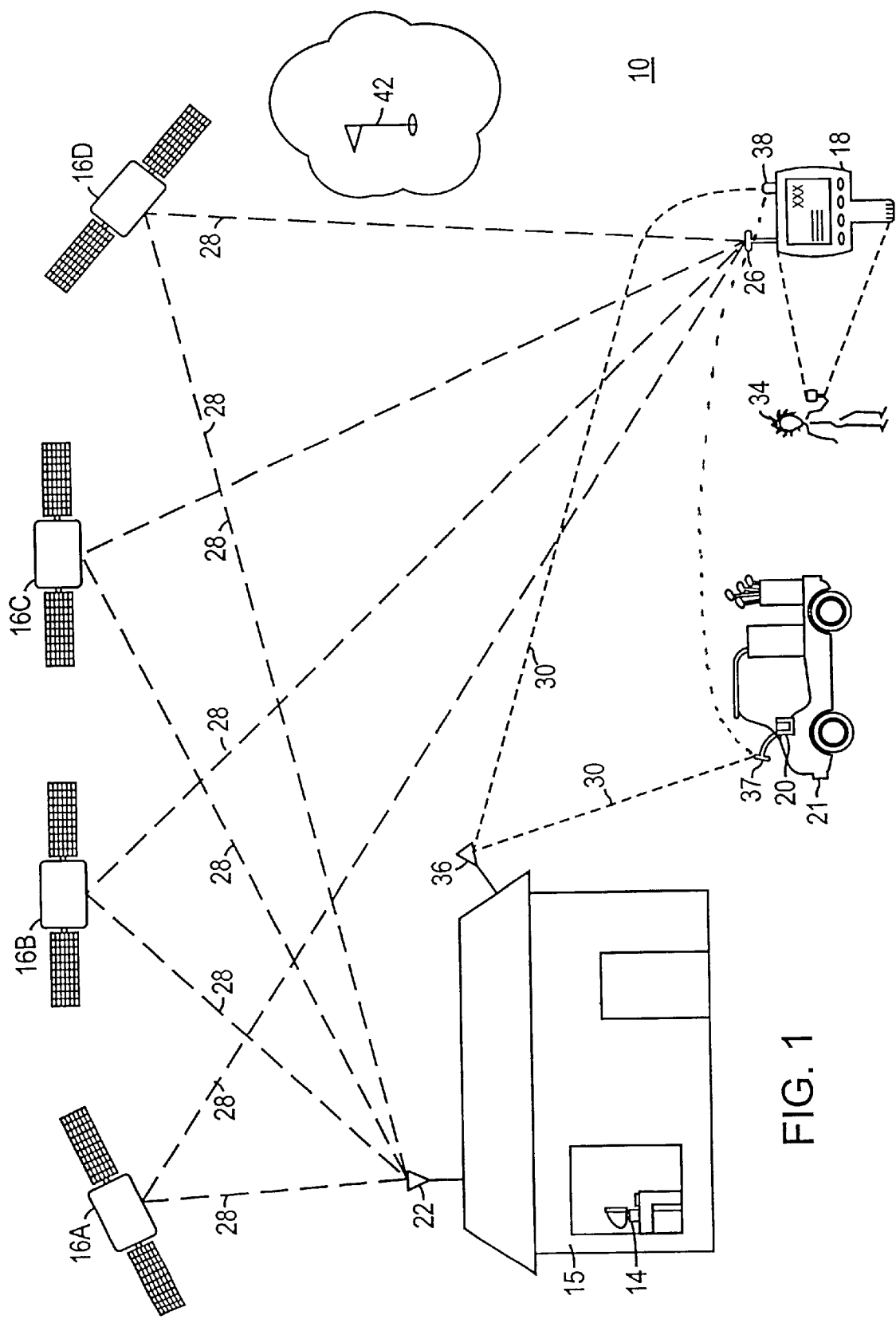
FIG. 1 is a diagram illustrating a distance determination system using differential GPS techniques according to one embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein rather, these embodiments are provided so that this disclosure will be thorough and complete, and will fully convey the scope of the invention to those skilled in the art. Like numbers refer to like elements throughout.

According to one embodiment, the present invention provides an improved system and method for determining the distance between a golfer and various points-of-interest on a golf course Advantageously, a hybrid distance determination system 10 according to one embodiment of the present invention enables a golfer to carry a lightweight, relatively inexpensive hand-held distance determining unit 18 to the golfer's golf ball in the fairway of a golf course. The hand-held unit 18 can be advantageously interconnected, such as via a cradle, with a cart-based unit that includes a battery connection, a large display screen, an RF transceiver, and other equipment for enhanced communications and distance determining functionality. The hybrid distance determination system 10 according to one embodiment of the invention thus combines the enhanced functionality available in a cart-based golf range-finder system with the portability and affordability of a small hand-held unit 18 that can be interconnected with the cart-based unit when the golfer returns from the fairway to the golf cart.

As used herein, the terms "hand-held distance unit," "mobile distance determination unit," "hand-held unit," "HHU," "hand-held distance determination unit," "hand-held distance determining unit," and "distance determination unit" are used interchangeably.

As used herein, the use of the term "WAAS" shall refer not only to a system of geosynchronous satellites that broadcast uplinked GPS correction signals to GPS receivers and other receivers in a region, but shall also mean any satellite-based, land-based, sea-based, or air-based system for broadcasting GPS correction signals relayed from surveyed ground stations that deduce a GPS correction signal from a difference between the surveyed location of such ground stations and the apparent location of such ground stations derived from measurements made by GPS receivers at those locations.

A hybrid distance determination system operating according to the principles of the present invention may serve multiple functions. Specifically, the hybrid distance determination system may operate in five different modes: a golfer mode, a greenskeeper mode, a surveyor mode, a test mode and a asset tracking mode. Each of these modes provides a different functionality within the distance determination and communication system 10. In addition to providing operational efficiency advantages over prior systems, the present invention also incorporates modules that display golf course information to a golfer based upon specific parameters entered in the system about the golfer. Other features of the system increase the accuracy of determining position fixes or locations for the golfer and improve the portability and affordability of the hand-held unit. These features are described in more detail in connection with the Figures.

Referring to FIG. 1, an overall diagram of a hybrid distance determination system 10 that uses differential GPS techniques according to one embodiment of the present invention is illustrated. In this embodiment, a system 10 of the present invention includes a central base station unit 14 preferably located at golf course club house 15, GPS navigational satellites 16A–16D, a cart-based unit 20 mounted on a golf cart 21, and several mobile distance determining units, such as hand-held unit 18. The GPS satellites 16A–16D transmit GPS navigation signals 28 that are detected at a central base station via a base station GPS receiver 22. The GPS navigation signals 28 are also received at the hand-held unit 18. by a hand-held unit GPS receiver 26. By decoding the GPS navigation signals 28 and determining the delay time between the transmission of the GPS navigation signals by the GPS satellites 16A–16D and the receipt of the navigation signals at the base station GPS receiver 22 and the hand-held unit GPS receiver 26, the central base station unit 14 and the hand-held unit 18 can determine their respective locations.

In this embodiment illustrated in FIG. 1, differential GPS correction techniques are used to improve location and distance determining accuracy. The base station unit GPS receiver 22 at the central base station unit 14 at the golf course club house 15 is precisely surveyed so that its location is very accurately known. Base station GPS receiver 22 determines a GPS-derived base station location, and a base station processor (not shown) generates a GPS correction signal that is a function of the difference between the precisely-known, surveyed base station location and the (apparent) GPS-derived base station location. Since many GPS navigation errors will be common to all GPS receivers over a broad area (over an area of several square miles, for example), the GPS correction signal generated by the base station processor can be used to correct for those errors at all GPS receivers located within that broad area (including the hand-held units 18 dispersed throughout a golf course, for example) In this embodiment, the central base station unit 14 includes a base station RF transceiver 36 adapted to communicate via wireless communications link 30 with cart-based units 20. The GPS correction signal is relayed from base station RF transceiver 36 to cart-based unit RF transceiver 37 via wireless link 30. In an alternate embodiment, the hand-held unit 18 may also include hand-held unit RF transceiver 38 for receiving the GPS correction signal and other information from the base station RF transceiver 36.

Armed with the GPS correction signal, hand-held unit 18 is adapted to calculate a more precise distance between the hand-held unit 18 and a point of interest on the golf course, such as pin 42, than would be possible without the use of the aforementioned differential GPS technique. Hand-held unit 18 preferably stores location data for many points of interest on the golf course, such as pins 42, bunkers, creeks, and ponds. By comparing the corrected location of hand-held unit 18 with the stored location data associated with a point of interest, a precise distance to the point of interest can be calculated. The distance information is thereafter preferably displayed to the golfer 34 by a hand-held unit display. Advantageously, other information may be transmitted between the base station 14 and hand-held distance unit 18 or the cart-based unit 20 via wireless link 30.

In an alternate embodiment, a distance determining system is provided according to the present invention that comprises a central base station unit including base station receiver means for receiving and processing GPS navigation signals, base station processor means for generating a GPS correction signal, a base station RF transceiver means for communicating over a wireless link, and a base station controller means for controlling the elements of the base station. According to this embodiment, the system further includes a cart-based unit including a cart-based unit battery means, a cart-based unit RF transceiver means, a cart-based unit display means, and a connector cradle means that comprises a battery connector means for connecting the connector cradle means to the cart battery, a hand-held unit connector means for interconnecting the cart-based unit and the hand-held unit, and a DC power connector means for providing energy to the hand-held unit through the connector cradle means. According to this embodiment, the system further includes a hand-held unit comprising a hand-held unit GPS receiver means, a hand-held unit display means, a hand-held unit memory means for storing point of interest location data, and a hand-held unit controller means. According to this embodiment of the invention, the hand-held unit is adapted to calculate a distance between a point of interest and the hand-held unit by comparing the corrected GPS-based position of the HHU with the stored location data associated with the selected point of interest. Advantageously, the cart-based unit according to this embodiment is adapted to receive and electrically interconnect the hand-held unit via the connector cradle means so that location and distance information can be relayed to the cart-based unit and so that GPS correction signals can be relayed to the hand-held unit. In another embodiment, the cart-based unit is adapted to receive the GPS correction signal from the base station unit via the cart-based unit RF transceiver means and to provide the GPS correction signal to the hand-held unit via the connector cradle means. According to yet another embodiment, the hand-held unit further comprises a hand-held unit RF transceiver means for receiving GPS correction signals and other information from the central base station unit or from the cart-based unit.

The hand-held distance unit 18 is preferably operable in at least one of a plurality of modes in accordance with the information and data contained in a downloaded operating mode software module loaded into hand-held unit memory. One mode of operation. of the hand-held distance unit 18 include wirelessly transmitting pin position updates to a central base station, as well as defining points of interest on the golf course which may also be wirelessly transmitted to the base station. The update information and newly defined points of interest may be transmitted from the hand-held distance 18 unit via the hand-held unit RF transceiver 38 to the base station RF transceiver 36. This information may be wirelessly transmitted to all golfers on the golf course immediately after the updated or new location has been received. and processed at the base station. Depending on the mode of operation, the hand-held unit 18 can preferably both receive pin position updates and transmit points of interest updates.

The central base station 14 in a preferred embodiment comprises a base station computer. The base station computer preferably has a database, records and tables that identify the different types of points of interest, the location of various points of interest on the golf course, and operational parameters for the hand-held units 18. The points of interest include the location of pins, the locations of sand traps, the location of other landmarks on the golf course, or the location of the pins or markers on the practice areas of the course such as the driving range. The base station 14 is the central hub of communications for cart-based units 20 and hand-held units 18 on the golf course. The base station computer preferably transmits activation information and programming modes to the cart-based unit 20 so that the hand-held units 18 can be programmed and activated when inserted into a cradle in the cart-based unit.

As generally noted above, when the hand-held distance unit 18 is in the golfer mode, the distances between points of interest and the golfer are displayed on a hand-held unit display screen of the hand-held unit 18. For example, when a golfer desires to know the distances to the points-of-interest, the golfer inputs information identifying the golfer's local area (typically the hole the golfer is playing) and activates a button on the hand-held unit. Alternatively, the hand-held unit has no buttons but automatically detects which hole it is on. The location of the golfer is determined using the GPS receiver of hand-held distance unit 18 and the hand-held distance unit 18 calculates the distances between the golfer and pre-defined points of interest based on information stored in the unit and on the GPS correction signal received from base station 14 directly or via cart-based unit 20. In a preferred embodiment of the present invention, only the points of interest data that are relevant to the particular golfer are displayed. For example, the present invention in one advantageous embodiment takes into account the distance that a golfer is able to hit a golf ball or the skill of the golfer (referred to as personality parameters). For example, distances more than 270 yards away, except for the pin position which is always displayed, or points-of-interest behind the golfer are not displayed.

Figure 2:
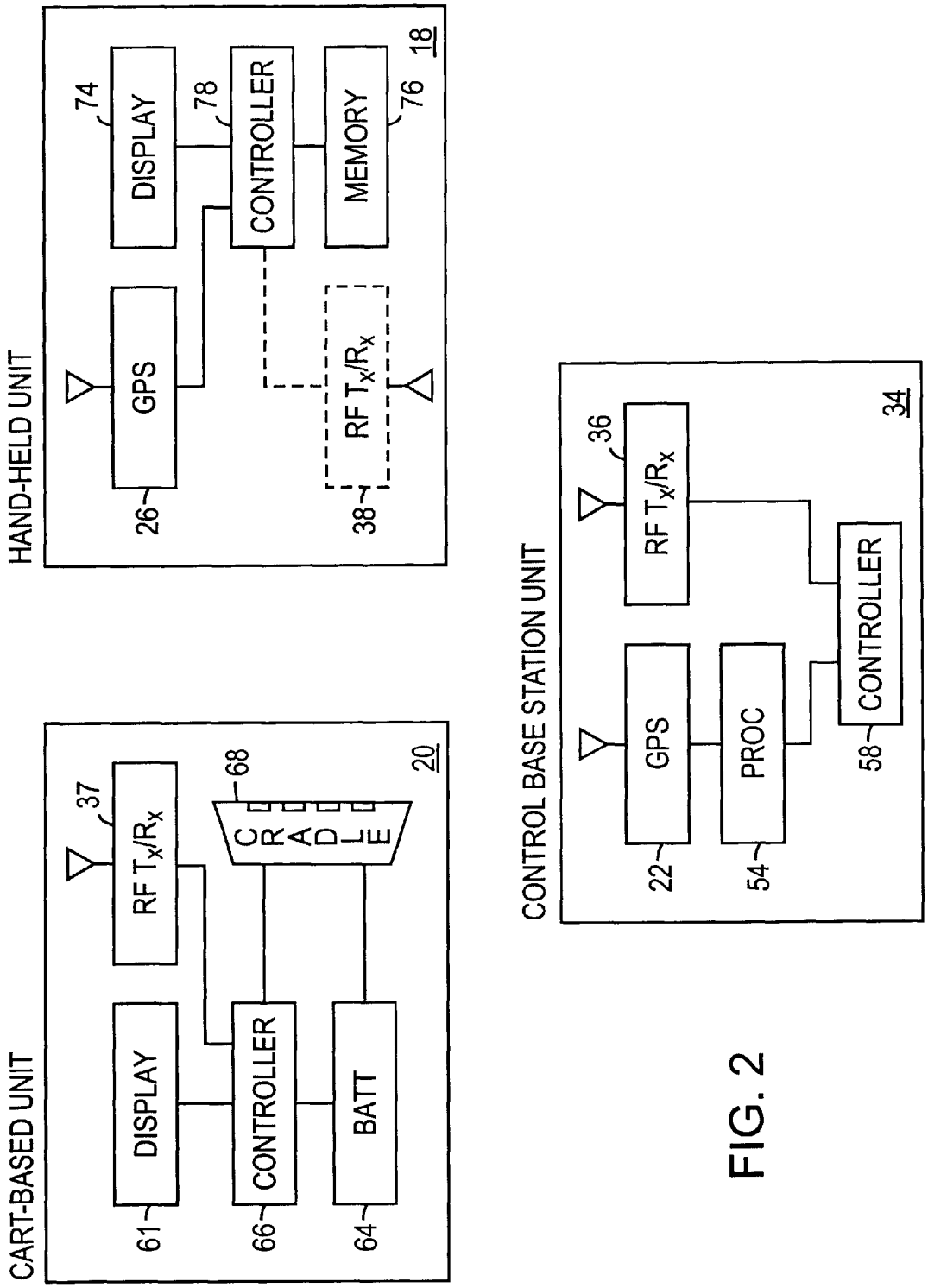
FIG. 2 is a block diagram indicating the relationships between a central base station unit, a cart-based unit, and a hand-held unit according to one embodiment of the invention.

Referring now to FIG. 2, the basic components of a base station unit, a cart-based unit and a hand-held unit according to one advantageous differential GPS embodiment of the invention are illustrated schematically. Central base station unit 14 includes base station unit GPS receiver 22 for receiving and processing navigation signals 28 from GPS satellites 16A–16D. Base station processor 54 is adapted to generate a GPS correction signal that is related to the difference between the known, surveyed location of central base station 14 and the apparent location indicated by base station GPS receiver 22. Base station RF transceiver 36 is adapted to communicate via wireless communications link 30, and base station controller 58 is adapted to control the aforementioned elements of the central base station unit 14.

Referring again to FIG. 2, the cart-based unit 20 includes cart-based unit RF transceiver 37 for adapted to communicate with base station RF transceiver 36 over wireless link 30. GPS correction signals from the base station unit are in one embodiment received via the cart-based unit RF transceiver 37 for relaying to the hand-held unit 18. Cart-based unit display 61 displays graphics, distance information, location information, paging information, messages, and other information to golfers in the cart 21. Cart-based unit battery 64 is preferably a battery on-board golf cart 21 and provides energy to the cart-based unit and to the connector cradle 68 that receives and interconnects hand-held unit 18. Cart-based unit controller 66 controls the aforementioned elements of the cart-based unit 20.

The connector cradle 68 preferably includes a battery connector adapted to electrically connect the cart-based unit battery 64 to the connector cradle, a hand-held unit connector adapted to electrically interconnect the cart-based unit 20 and the hand-held unit 18 when the hand-held unit is received in the connector cradle 68, and a DC power connector for providing energy from the cart-based unit battery 64 through the connector cradle to the hand-held unit. The cart-based unit 20 is preferably adapted to receive location and distance information from the hand-held unit via the connector cradle 68 for display on the cart-based unit display 61.

Referring again to FIG. 2, the hand-held unit 18 according to one embodiment of the invention includes a hand-held unit GPS receiver 26, a hand-held unit display 74 for displaying graphics, text, distance information, location information, paging information, and other information to a golfer or other user of the system. The hand-held unit also includes a memory 76, such as random access memory or other digital memory known in the art, for storing location data associated with points of interest on the golf course. The hand-held unit 18 further includes a hand-held unit controller 78 that controls the operation of the hand-held unit GPS receiver 26, hand-held unit display 74, and hand-held unit memory 76. The hand held unit 18 may also include a hand-held unit RF transceiver 38 for communicating with the base station unit RF transceiver 37 or the cart-based unit RF transceiver 36. GPS correction signals from the base station unit may according to one embodiment be received by the cart-based unit 20 via the cart-based unit RF transceiver 37. The GPS correction signals according to one embodiment may be relayed to the hand-held unit 18 either through connector cradle 68 or via wireless communications from cart-based RF transceiver 37 to hand-held unit RF transceiver 38. Alternatively, the GPS correction signals according to one embodiment may be relayed to the hand-held unit 18 directly from the central base station unit 14 from base station unit RF transceiver 36 to hand-held unit RF transceiver 38.

Figure 3:
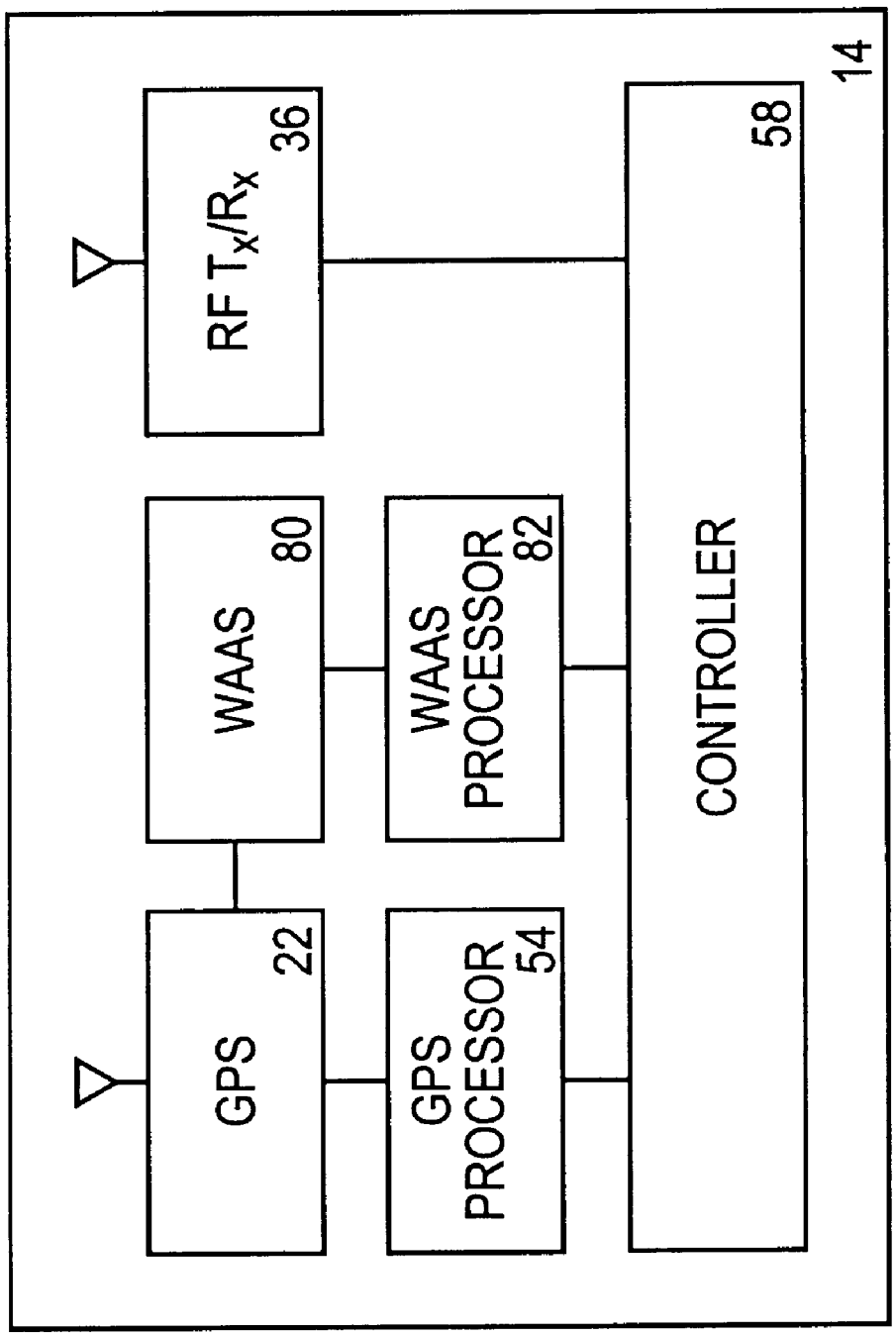
FIG. 3 is a block diagram of the components of a central base station unit according to one embodiment of the invention.

Referring now to FIG. 3, a block diagram is illustrated of the components of the central base station unit 14 according one embodiment of the invention. According to this embodiment, the WAAS system is used to generate correction signals to be provided to the hand-held distance determining units 18. The base station unit 14 according to this embodiment includes a base station unit GPS receiver 22 that includes a base station unit WAAS receiver 80. The base station unit WAAS receiver is preferably built into the base station GPS receiver. WAAS correction signals broadcast from WAAS satellites are received through the GPS receiver by base station unit WAAS receiver 80 at the same L-band frequency at which GPS navigation signals are broadcast by GPS satellites. Base station unit WAAS processor 82 determines WAAS correction data from the received WAAS correction signal. The WAAS correction data may thereafter be transmitted through base station unit RF transceiver 36 to cart-based unit 20 and then provided to hand-held units 18 via connector cradle 68 or via the hand-held unit RF transceiver. In one embodiment, the hand-held unit 18 further includes an infrared transceiver (not shown) to electrically interconnect the hand-held unit to the cart-based unit via the connector cradle. Alternatively, the WAAS correction data may be wirelessly transmitted from central base station unit 14 directly to hand-held unit 18 if hand-held unit 18 includes a hand-held unit RF transceiver 38. Alternatively, the WAAS correction signal may be received directly by the hand-held unit GPS receiver. In the aforementioned embodiments, the hand-held unit 18 advantageously generates location information from a combination of the GPS-derived hand-held unit location data and the WAAS correction data.

The hand-held unit 18 preferably includes input means, such as an input keypad or an input touch screen, to enable a golfer or other user of the system to provide inputs to the system. In another embodiment of the invention, the base station unit controller 58 may be adapted to process paging messages, such as a page from the clubhouse to a golfer on the course alerting the golfer of an emergency, and to transmit a paging message over the base station unit RF transceiver 36. The hand-held unit controller 78 may accordingly be adapted to process a paging message received from the base station unit either directly through hand-held unit RF transceiver 38 (if hand-held unit 18 is so equipped) or via the cart-based RF transceiver. Preferably, hand-held unit 18 includes a battery, such as a rechargeable battery that can be recharged when the hand-held unit is received in connector cradle 68.

In yet another advantageous embodiment of the invention, the hand-held unit GPS receiver 22 includes a WAAS receiver (not shown) for receiving WAAS correction signals directly from WAAS satellites, and no WAAS-equipped receiver is needed at the central base station. According to this embodiment, the hand-held unit controller 78 determines WAAS correction data from the received WAAS correction signal. The hand-held unit 18 then generates location information from a combination of the GPS-derived hand-held unit location data and the WAAS correction data.

Figure 4:
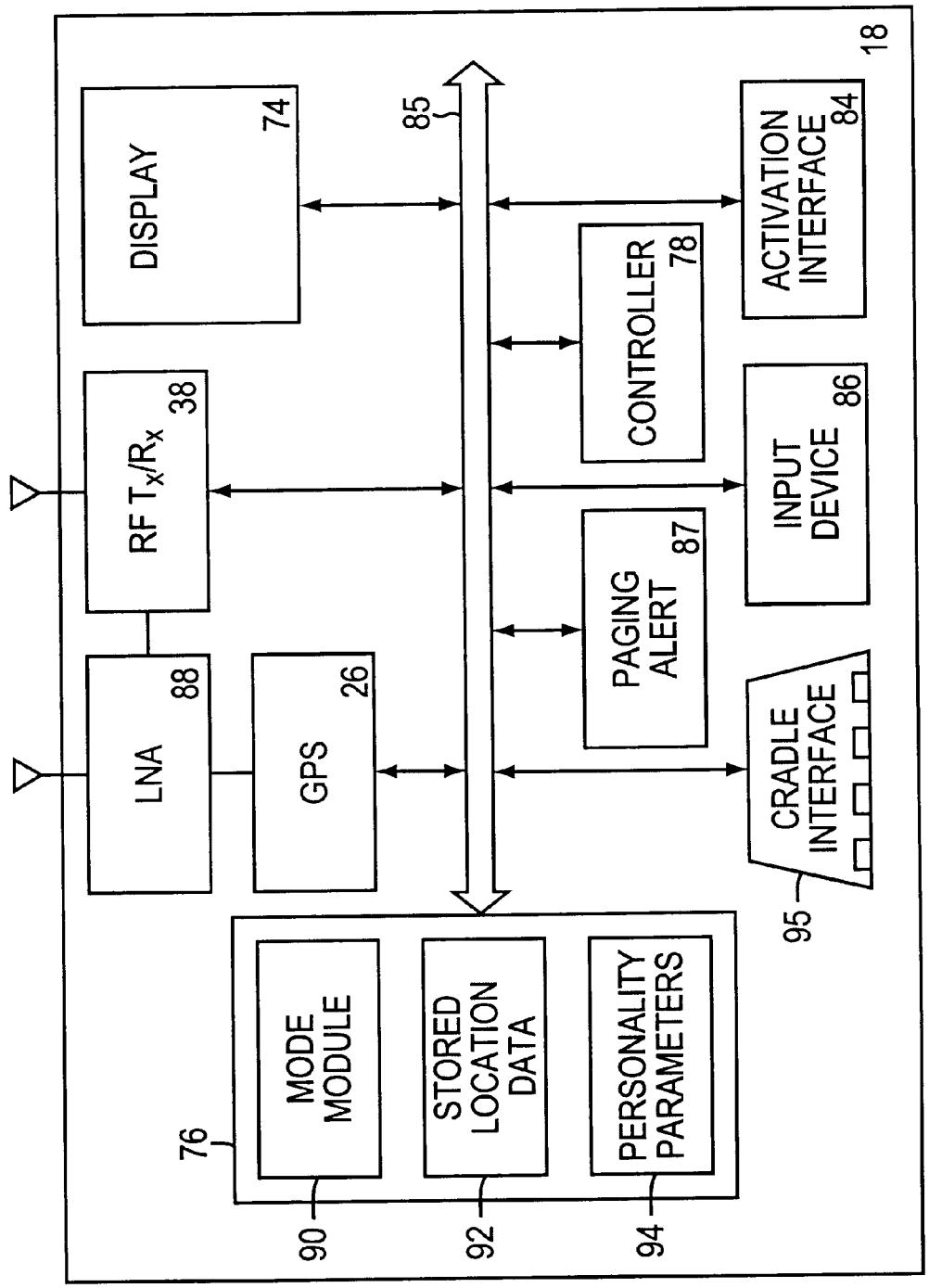
FIG. 4 is a block diagram of the components of a hand-held unit according to one embodiment of the invention.

Referring to FIG. 4, a more detailed block diagram of the components of a hand-held distance unit 18 according to one embodiment of the invention is illustrated. The hand-held distance unit 18 has an activation interface 84, a data and communications bus 85 interconnecting the components, a hand-held unit memory 76, a hand-held unit controller 78, a hand-held unit input device 86 (such as push buttons, a keypad, a touch screen, or other input devices known in the art), a paging alert circuit 87, an optional hand-held unit RF transceiver 38, a hand-held unit GPS receiver 26 that may include a low noise amplifier 88, and a hand-held unit display 74 (such as an LCD display, an LED display, or other displays as are known in the art).

The hand-held distance unit 18 advantageously performs a number of functions. According to one embodiment of the invention the hand-held distance unit 18 has a hardware platform whose functionality is determined on a variable basis depending on the particular software module loaded into the hand-held distance unit 18 at the time of activation of the unit, such as by the cart-based unit 20. The hand-held distance units 18 may serve as a distance determining device for individual golfers when operating in a golfer mode and as a point of interest defining and locating device when operating in a surveyor mode, such as by a greenskeeper or course manager. The surveyor mode is most useful when a new golf course is being configured and the point of interest database in the central base station unit is being configured. A test mode may also be used for analyzing the GPS and RF coverage of the golf course, which is particularly useful in the initial configuration process of a golf course.

Software modules for providing the functionality of different modes of operations for the hand-held distance unit are downloaded through the activation interface 84. Preferably, the hand-held unit may be programmed when installed in the connector cradle of the cart-based unit. When the hand-held distance unit 18 is activated, the appropriate modules are downloaded through the activation interface 84 to the hand-held unit memory 76 of the hand-held distance unit 18. The downloaded mode module 90, downloaded points of interest data 92, and personality parameters 94 (such as the skill level of the golfer) are all stored in the hand-held unit memory 76.

As discussed above, the position of the hand-held distance unit 18 is determined by receiving and processing GPS satellite navigation signals by hand-held unit GPS receiver 26. Low noise amplifier 88 sets the receiver noise floor and provides sufficient gain to the received signals so that the GPS receiver 26 can properly detect and process the navigation signals received. In one embodiment of the invention, differential GPS correction signals are received by the hand-held unit 18 from the base station unit RF transceiver, either directly via the hand-held unit RF transceiver 38 or indirectly through hand-held unit cradle interface 95 from the cart-based unit. The hand-held unit GPS receiver 26 processes and outputs its position estimates to the hand-held distance unit controller 78. The hand-held unit controller 78 compares the generated hand-held unit location information with the location data 92 stored in hand-held unit memory 76 and associated with relevant points of interest to determine the distances from the hand-held unit 18 to the points of interest. The hand-held unit controller 78 also performs other routines, such as determining what information to display on hand-held unit display screen 74, monitoring the input device 86 to determine the next function to be performed and what information is to be displayed, and providing location information, distance data, and other information to the cart-based unit through hand-held unit cradle interface 95.

Figure 5:
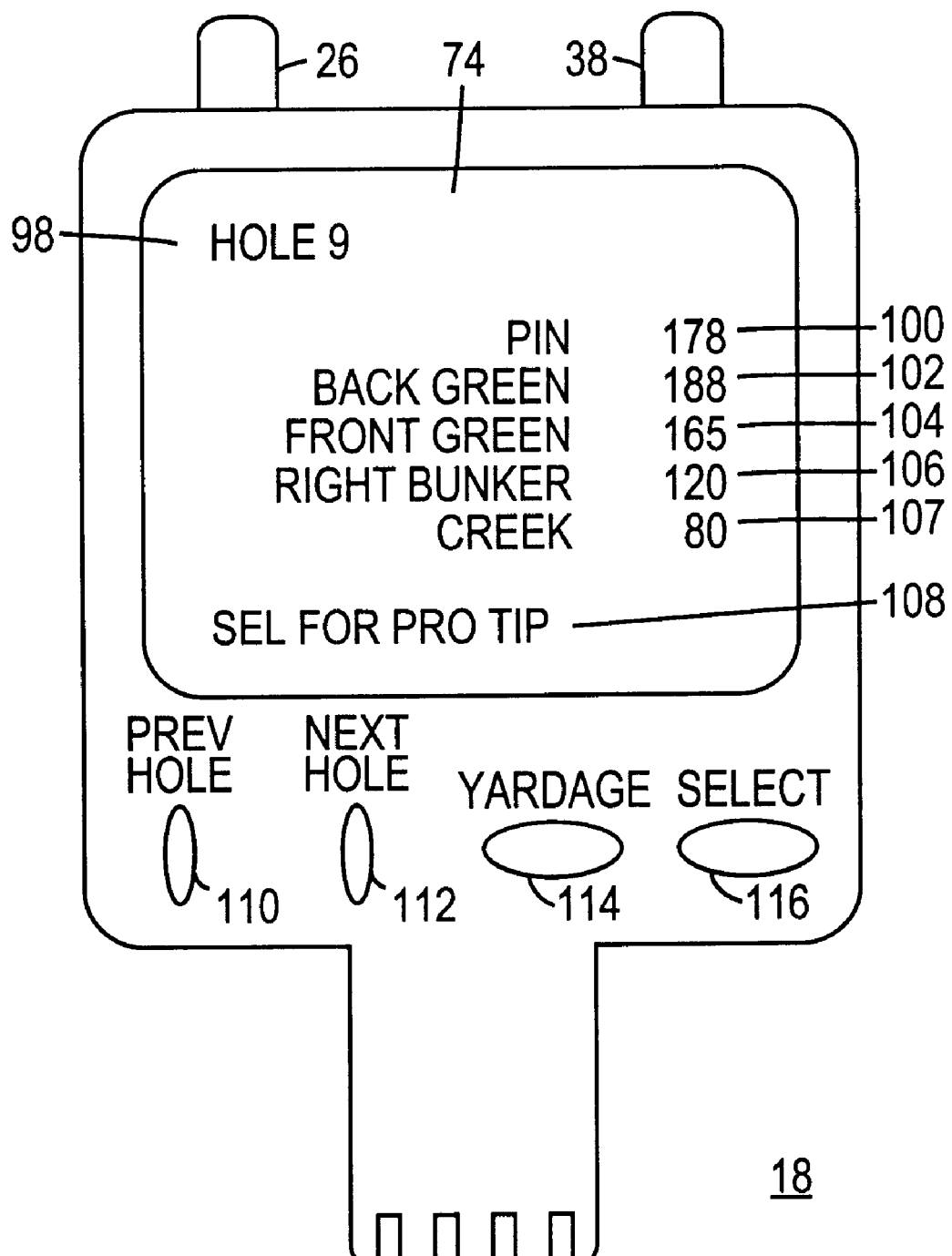
FIG. 5 is a diagram indicating the layout of a hand-held unit according to one embodiment of the present invention.

Referring to FIG. 5, the hand-held distance unit 18 is shown in more detail. The hand-held unit display 74 of the hand-held distance unit 18 is illustrated for when the hand-held distance unit 18 is operating in the golfer mode. As illustrated, the distances to various points of interest are displayed on the hand-held unit display 74. Particularly, for the hole shown, a hole field 98 giving the number of the hole being played is displayed, along with the pin distance field 100, back of the green distance field 102, front of the green distance field 10, right bunker distance field 105, and creek distance field 107. As will be apparent to those skilled in the art, additional fields providing distances to other points of interest may also be displayed depending on the hole being played and the location of the hand-held unit 18 on the golf course. The hand-held distance unit display screen 96 also has an optional field 108 for selecting a pro tip, such as to inform the golfer that the green on the hole being played slopes severely right and that the wise shot is therefor to the left of the pin on the green.

In the embodiment illustrated in FIG. 5, the operation by the golfer of the hand-held distance unit 18 is controlled by the use of four input pushbuttons which are used to initiate varied operations in each of the different modes. Particularly, the hand-held distance unit 18 of one embodiment includes a next hole button (NEXT HOLE) 110, a previous hole button (PREV HOLE) 112, a yardage request button (YARDAGE) 114, and a soft-key button (SELECT) 116. The golfer defines which hole the golfer is playing by pressing the next hole button 112 or the previous hole button 110. When the golfer presses the previous hole button 110, the golf hole number decrements. When hole "1" is displayed and the previous hole button is pressed, the 18th hole appears. The next hole button 112 performs the opposite function of the previous hole button 110 and causes the next golf hole after the currently displayed golf hole to be displayed in the hole field 98. Alternatively, the hand held distance unit 18 can be configured when in the golfer mode to automatically advance holes that are displayed as the golfer plays his or her round of golf based on the hand held distance unit's position in relation to known positions on the golf course.

When a golfer desires to obtain yardage information, the golfer stands near the golf ball and presses the yardage button 114. Although the GPS receiver within the hand-held distance unit 18 is preferably continuously on and determining the current position of the hand-held unit, the yardage information for the particular hole is not displayed until the yardage button 114 is pressed. When the yardage button 114 is pressed, the system determines the current location of the golfer and then utilizes the known location of other points of interest on a hole to calculate the distance from the user's current location to these points of interest. These points of interest are displayed in the fields 100, 102, 104, 106, and 107 as discussed above.

Software routines may advantageously be incorporated to eliminate points of interest on a particular hole that are too far away to be of concern for the particular golfer (maximum range value) or too close, such as less than 25 yards away (minimum range value). These software routines for the displaying the points-of-interest data preferably do not display points of interests for the hole that are behind a golfer. Therefore, the hand-held distance unit of the present invention advantageously only displays information that is truly relevant for the golfer's current golf shot. Preferably, the distance to the pin field 100 is always displayed. After yardages are displayed to the various points of interest, the golfer can press the soft key SELECT button 116 to obtain a pro tip.

The hand-held unit 18 may also be operated in a greenskeeper mode. In this mode, a greenskeeper, course manager, or other user can define new pin locations on the golf course and these locations may be wirelessly transmitted in real-time to the base station 14 for updating. As known, the pin positions on golf courses are typically moved on a daily basis. When the pin positions are moved, the system of the present invention provides an improved method for tracking the new pin positions and provides pin updates to all users of the system 10 at the time the updates are made to ensure that all users have the latest updates for the pin positions.

When the greenskeeper or user moves the pin to a new position on the green, the new pin position is measured and transmitted back to the base station 14 for storage and processing. The greenskeeper selects the appropriate hole with the previous hole button 110 or the next hole button 112 (or the hole can be automatically determined as discussed previously). The greenskeeper then positions the hand-held distance unit over the hole and presses the yardage button 114 to obtain measurements for the new hole location. Several measurements are calculated when the user presses the yardage button and these measurements are compared to determine whether an accurate measurement for the hole has been obtained. The accuracy of the measurement is advantageously verified by two criteria. First, several sets of GPS readings are obtained after the user presses the yardage button 114 and are compared to determine if the all are within a small error range of each other. Also, GPS parameters may be compared and weighted. If the readings are all within the selected error criteria of each other, the measurements are averaged to produce the location for the current hole position.

In the greenskeeper mode, updated pin positions may be wirelessly transmitted to the base station 14, such as directly transmitted by the optional hand-held unit RF transceiver 38 to the base station 14 where the base station 14 stores the new pin position for transmission to other golfers on the golf course. Advantageously, the updated pin position information may alternatively be relayed to the cart-based unit 20 when the hand-held unit 18, in greenskeeper mode, is received by connector cradle 68 in cart-based unit 20, thus enabling the hand-held unit to have reduced size, weight and cost. The base station 14 then wirelessly broadcasts the new pin position and other location data to all hand-held units on the golf course, either directly via an optional hand-held unit RF transceiver 38 or indirectly through cart-based unit 20 via connector cradle 68. New location data associated with points of interest are then stored in hand-held unit memory 76 for use in subsequently determining distance to the points of interest.

Figure 6:
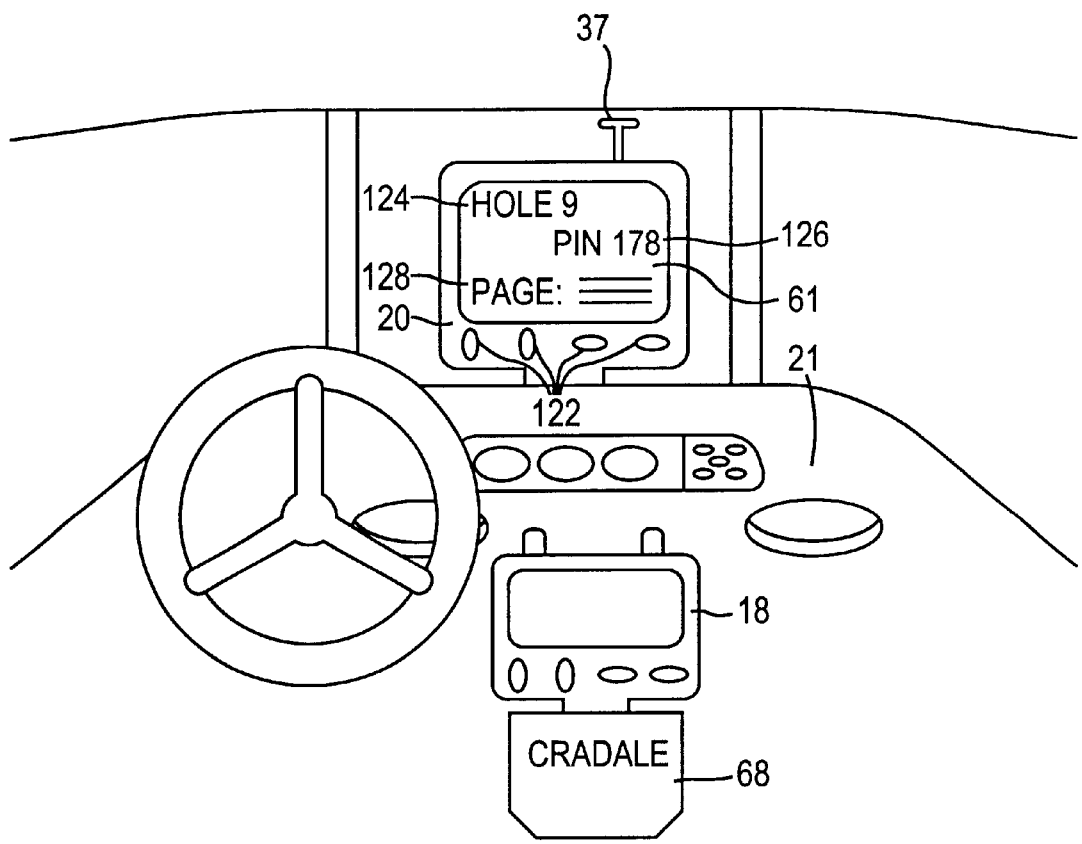
FIG. 6 is an illustration of a golf cart installation of a cart-based unit including a cradled hand-held unit according to one embodiment of the invention.

Referring now to FIG. 6, a cart-based unit 20 according to one embodiment of the invention is illustrated. The cart-based unit is installed on the front dashboard inside a golf cart 21. In FIG. 6, a hand-held distance determining unit 18 is shown cradled in a connector cradle 68 of cart-based unit 20. A cart-based unit battery (not shown), such as a battery that provides a power source for the golf cart 21, provides power to the cart-based unit. Cart-based unit RF transceiver 37 communicates wirelessly with the central base station unit to receive GPS correction signals, WAAS correction signals, paging information, or other information and to transmit information to the central base station unit. In one embodiment, cart-based unit RF transceiver 37 also communicates wirelessly with hand-held unit 18 through an optional hand-held unit RF transceiver. Cart-based unit display 61 displays graphics, distance information, location information, and other information to a golfer or other user of the system. Advantageously, the location information and other information displayed on cart-based unit display 61 is developed in hand-held unit 18 and is provided to cart-based unit 20 through connector cradle 68 when the hand-held unit is seated in the connector cradle. According to one embodiment, GPS correction signals or WAAS correction data is provided to hand-held unit 18 by cart-based unit 20 through connector cradle 68.

In its simplest and most preferred embodiment, cart-based unit display 61 comprises an LCD display system and a data interface means for receiving data and graphics to be viewed on cart-based unit display 61 from a hand-held distance unit 18. The cart display unit is mounted in the golf cart and is powered by the battery typically found on golf carts. User requests and responses to information viewed on the LCD display are input using either the buttons 122 on cart-based unit 20 or the buttons 110, 112, 114, 116 on hand-held unit 18. Advantageously, cart-based unit display 61 may be a color display such as a model DMF-51108 NC-FW manufactured by Optrex of 3-14-9 Yushima, Bunkyo-ku, Tokyo 113 Japan.

According to one embodiment, cart-based unit display 61 displays the same type of information that the hand-held unit display displays when the hand-held unit 18 is not seated in the connector cradle 68. For example, hole field 124 in cart-based unit display 61 indicates the hole being played by the golfer, pin distance field 126 indicates the distance from the cart to the pin (since the hand-held distance unit 18 is seated in the connector cradle 68), and page alert field 128 provides a text page message from the golf course clubhouse for the golfer.

When hand-held unit 18 is received in connector cradle 68 or is otherwise interfacing with the cart-based unit 20, hand-held unit display 74 and pushbuttons 110, 112, 114, 116 on the hand-held distance units 18 preferably continue to function. Preferably, two connector cradles 68 are provided since the typical golf cart is configured to accommodate two golfers. However, fewer or additional connector cradles can be provided for interfacing with cart-based unit 20. Preferably, cart-based unit display 61 receives power from the cart battery via the connector cradle 68, allowing cart-based unit 20 to be later added to the golf cart without having to add a new connection to the cart battery. Alternatively, cart-based unit display 61 can be separately wired or inductively coupled to the cart battery. Connector cradle 68 supplies power to hand-held distance unit 18 when seated in the connector cradle, preferably via respective electrical contacts (not shown) supplied on each hand-held unit 18 for that purpose.

Cart-based unit display 61 is larger in size than hand-held unit display 74. This allows graphics such as detailed hole layouts or greens layouts to be selectably displayed. Further, when not showing hole or green graphics, a menu may be displayed permitting the golfer to order goods or services for purchase or to response to a message that has been received by hand-held distance unit 18. A default menu is displayed allowing the golfer to select hole graphics or one or more other menus. Advertisements can also be displayed along with or in place of the menus and/or graphics. By using input keys 122, the golfer can enter his or her order or reply to a message that has been previously downloaded into the cart-based unit 20.

When entering orders or responses, the cart-based unit 20 can be programmed to have the user enter an ID number which will be sent with the order or response to ensure proper accounting and/or routing. Alternatively, the cart-based unit can be programmed to have the interfacing hand-held units provide their identification numbers for use with the orders and responses. This is useful where only one hand-held display unit 18 is plugged in, enabling cart-based unit 20 to automatically associate the hand-held distance unit identification number with the response or request. Where two users are assigned to one hand-held distance unit, their names can be stored in the system and associated with the ID number for that hand held distance unit. The cart-based unit can receive their names from the central base station unit and can present a display inquiring as to which user is placing an order and submit that information with the request. When multiple hand-held distance units 18 are interfaced to cart-based unit 20, cart-based unit 20 is programmed to display a list of the registered hand-held units 18 and names from which the user would select. Registration of a hand-held unit that is interfacing with a cart display unit, use of the golfer's names and hand-held distance unit IDs advantageously allows the individual accounts of the golfers to be posted with their charges independent of which cart display unit is being used.

In alternate embodiments of cart-based unit 20, controller 66 and/or input keys 122 on cart-based unit 20 can be eliminated and the processing capabilities and/or input devices of the hand-held-distance units 18 can be used instead to drive cart-based unit display 61.

Figure 7:
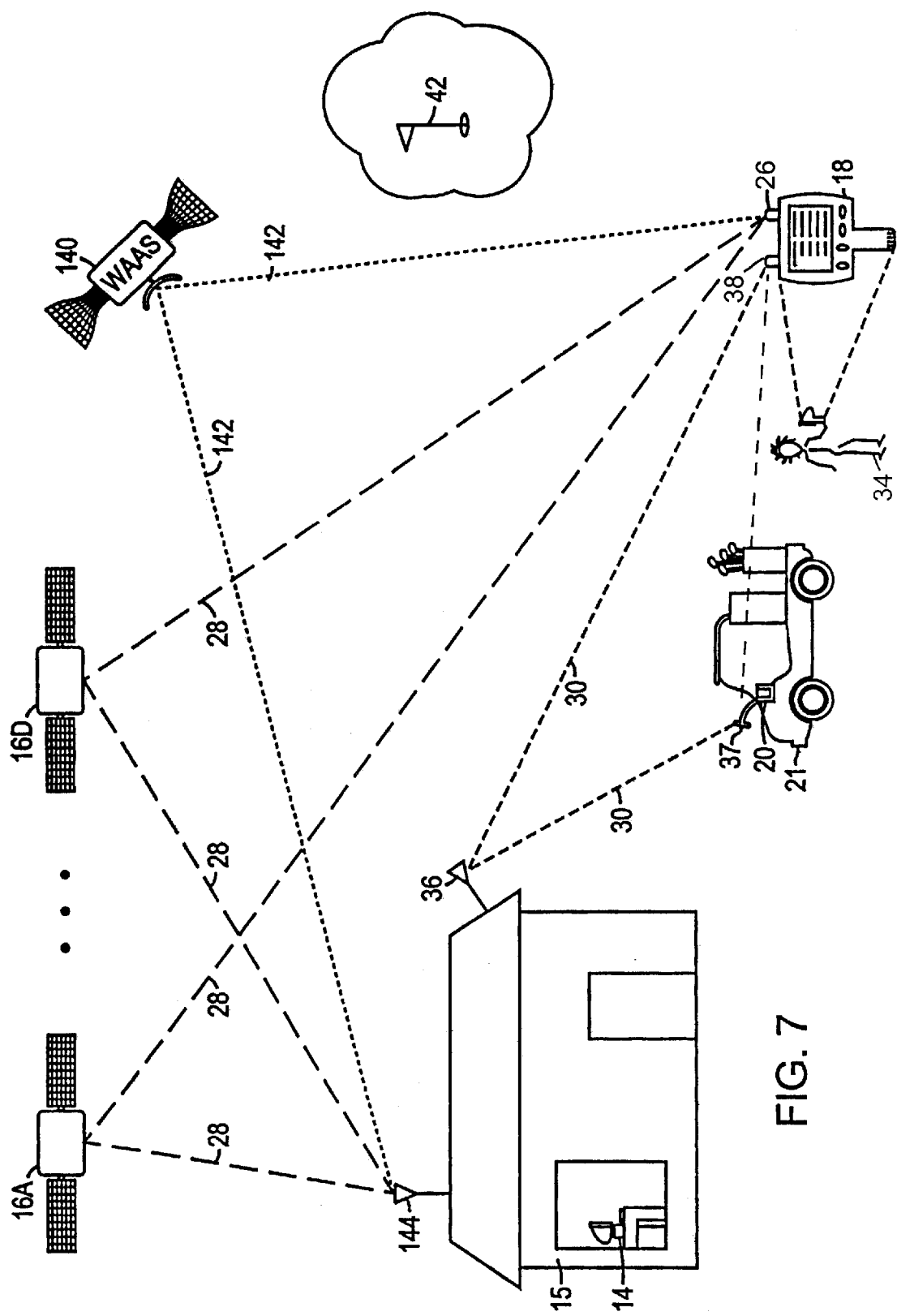
FIG. 7 is a diagram illustrating the relationships between a central base station unit, a cart-based unit, and a hand-held unit in a distance determination system utilizing the Wide Area Augmentation System (WAAS) through a central base station according to one embodiment of the invention.

Referring now to FIG. 7, the relationships between a central base station unit 14, a cart-based unit 20 and a hand-held unit 18 are illustrated in a distance determination system utilizing correction signals from the Wide Area Augmentation System (WAAS) at the central base station according to one advantageous embodiment of the invention. In this embodiment, a system 10 of the present invention includes a central base station unit 14 preferably located at golf course clubhouse 15, at least four GPS navigational satellites 16A–16D, at least one WAAS satellite 140, a cart-based unit 20 mounted on a golf cart 21, and several mobile distance determining units, such as hand-held unit 18. The GPS satellites 16A–16D transmit GPS navigation signals 28 that may be detected at a central base station via an optional base station GPS receiver 22. The GPS navigation signals 28 are also received at the hand-held unit 18 by a hand-held unit GPS receiver 26. By decoding the GPS navigation signals 28 and determining the delay time between the transmission of the GPS navigation signals by the GPS satellites 16A–16D and the receipt of the navigation signals at the base station GPS receiver 22 and the hand-held unit GPS receiver 26, the central base station unit 14 and the hand-held unit 18 can determine their respective locations.

In this embodiment illustrated in FIG. 7, WAAS correction techniques are used to improve location and distance determining accuracy. A WAAS correction signal 142 is broadcast by WAAS satellite 140 and received by a base station WAAS receiver 144. As described previously, the WAAS correction signal indicates how an apparent GPS position reading in the broadcast coverage area should be corrected in order to compensate for common mode GPS position determining errors. The WAAS correction signal is broadcast at the same L-band frequency that GPS navigation signals are broadcast at, so standard GPS receivers may receive the WAAS correction signal 142 without substantial modification. Base station unit 14 includes a WAAS receiver 144 adapted to receive the WAAS correction signal 142 and includes a base station processor adapted to determine WAAS correction data from the WAAS correction signal. Optionally, hand-held unit 18 may also include a hand-held unit GPS receiver 38 that is adapted to receive the WAAS correction signal 142, and the hand-held unit controller may also be adapted to determine WAAS correction data from the received WAAS correction signal.

In this embodiment, the central base station unit 14 includes a base station RF transceiver 36 adapted to communicate via wireless communications link 30 with cart-based units 20. The WAAS correction data may be relayed from base station RF transceiver 36 to cart-based unit RF transceiver 37 via wireless link 30. In an alternate embodiment, the hand-held unit 18 may also include hand-held unit RF transceiver 38 for receiving the WAAS correction data along with other information directly from the base station RF transceiver 36. In still another embodiment, hand-held unit 18 may receive WAAS correction signals directly from the WAAS satellite.

Armed with the WAAS correction data, hand-held unit 18 is adapted to calculate a more precise distance between the hand-held unit 18 and a point of interest on the golf course, such as pin 42, than would be possible without the use of the aforementioned WAAS correction technique. Hand-held unit 18 preferably stores location data for many points of interest on the golf course, such as pins 42, bunkers, creeks, and ponds. By comparing the corrected location of hand-held unit 18 with the stored location data associated with a point of interest, a precise distance to the point of interest can be calculated. The distance information is thereafter preferably displayed to the golfer 34 by a hand-held unit display. Advantageously, other information may be transmitted between the base station 14 and hand-held distance unit 18 or the cart-based unit 20 via wireless link 30.

In another advantageous embodiment, hand-held unit GPS receiver 26 is adapted to receive WAAS correction signals directly from the WAAS satellite (rather than through a WAAS receiver at a base station) and to determine WAAS correction data directly. According to this embodiment, there is no need for a base station unit GPS receiver or base station unit WAAS receiver 144. Instead, the hand-held unit 18 according to this embodiment receives and processes WAAS correction signals 142 and determines hand-held unit location and distance data independently of any base station unit.

In one advantageous embodiment with minimal hardware requirements, the distance determining system 10 includes a base station unit 14 having a base station unit RF transceiver 36 and a base station controller. In this system, a cart-based unit 20 is provided including a cart-based unit RF transceiver 37, a cart-based unit display 61, and a cart-based unit battery 64. In this system, a hand-held unit 18 is further provided that includes a hand-held unit GPS receiver 26 with WAAS capability, a hand-held unit display 74, a hand-held unit controller 78, a hand-held unit memory 76, and a rechargeable battery.

According to the invention, the size, power consumption, and cost of hand-held unit 18 may be reduced by including a hand-held unit RF transceiver 38 that is a receiver only (and not a transmitter). In this embodiment, the hand-held unit is adapted to receive GPS correction signals or WAAS correction data via receive-only hand-held unit RF transceiver 38.

When the hand-held distance unit 18 is in a golfer mode, the distances between points of interest and the golfer are displayed on a hand-held unit display screen of the hand-held unit 18. For example, when a golfer desires to know the distances to the points-of-interest, the golfer inputs information identifying the golfer's local area (typically the hole the golfer is playing) and activates a button on the hand-held unit. The location of the golfer is determined using the GPS receiver of hand-held distance unit 18 and the hand-held distance unit 18 calculates the distances between the golfer and predefined points of interest based on information stored in the unit and on the WAAS correction data received from base station 14 directly or via cart-based unit 20. In a preferred embodiment of the present invention, only the points of interest data that are relevant to the particular golfer are displayed. For example, the present invention in one advantageous embodiment takes into account the distance that a golfer is able to hit a golf ball or the skill of the golfer (referred to as personality parameters). For example, distances more than 270 yards away, except for the pin position which is always displayed, or points-of-interest behind the golfer are not displayed.

Figure 8:
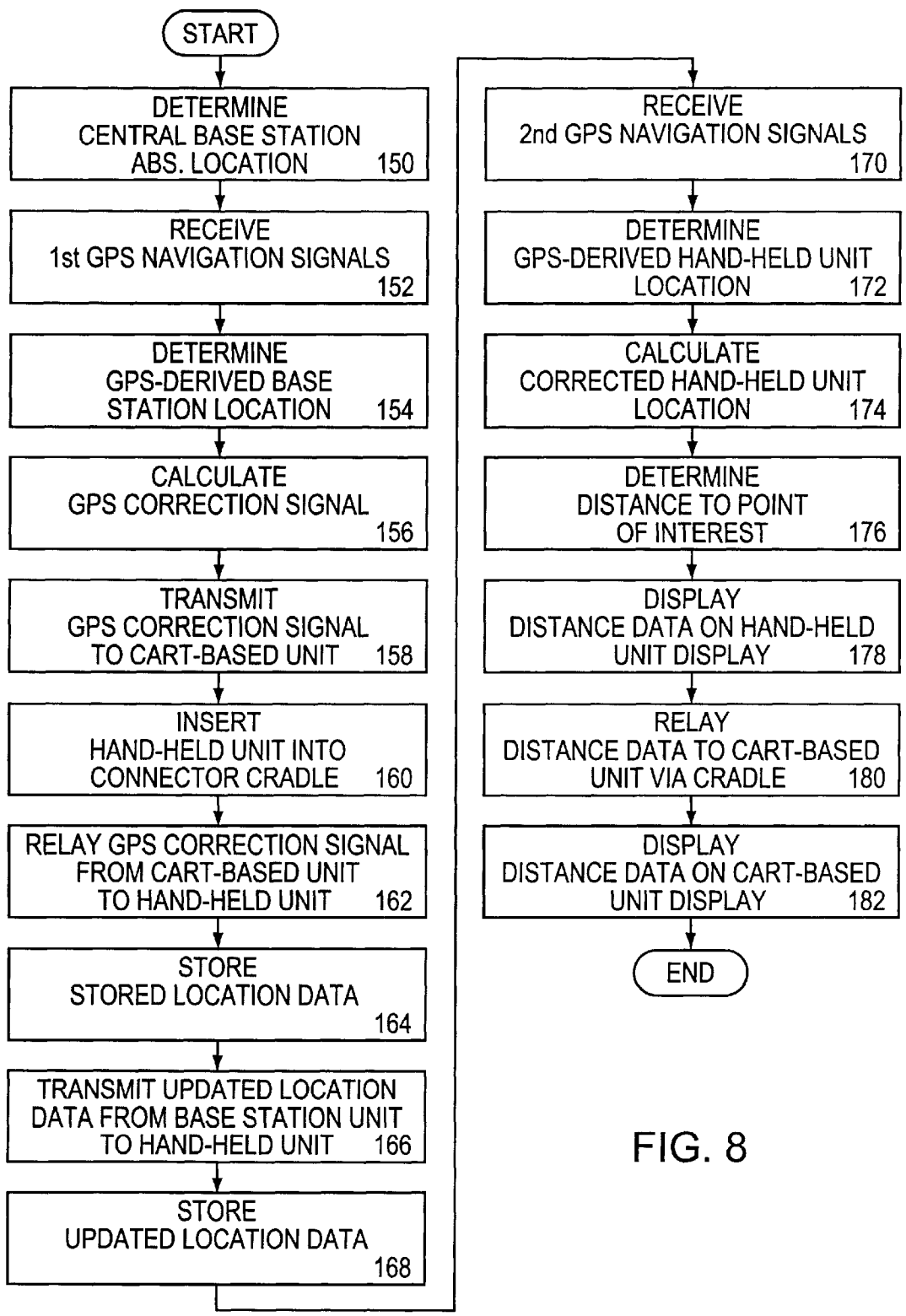
FIG. 8 is a flow diagram indicating the steps in a golf distance determination method using differential GPS according to one embodiment of the invention.

Referring now to FIG. 8, the steps in a golf distance determination method using differential GPS techniques according to one embodiment of the invention are provided. At step 150, the absolute location of a central base station relative to a fixed coordinate system is determined, such as by surveying or other precision locating techniques known in the art. At step 152, a first set of navigation signals from the GPS satellites is received at the central base station. At step 154, a GPS-derived base station location relative to the fixed coordinate system is determined from the first set of navigation signals. At step 156, a GPS correction signal is calculated that is a function of the difference between the absolute location of the central base station and the GPS-derived base station location. At step 158, the GPS correction signal is transmitted to the cart-based unit from the base station unit. At step 160, a hand-held unit having a hand-held unit display is inserted into a connector cradle that provides an electrical interconnection between the cart-based unit and the hand-held unit. At step 162, the GPS correction signal is relayed from the cart-based unit to the hand-held unit. At step 164, a plurality of stored location data associated with the selected points of interest on the golf course is stored in memory. At step 166, a plurality of updated location data is transmitted from the central base station to the hand-held unit. At step 168, the updated location data is stored in the hand-held unit. At step 170, a second set of navigation signals from the GPS satellites is received in the hand-held unit. At step 172, a GPS-derived hand-held unit location relative to the fixed coordinate system is determined from the second set of navigation signals. At step 174, a corrected hand-held unit location relative to the fixed coordinate system is calculated from a combination of the GPS-derived hand-held unit location and the GPS correction signal. At step 176, a distance data between the hand-held unit and a first point of interest on the golf course is determined by comparing the corrected hand-held unit location with the stored location data associated with the first point of interest. At step 178, the distance data is displayed on the hand-held unit display. At step 180, the distance data from the hand-held unit is relayed to the cart-based unit through the connector cradle. At step 182, the distance data is displayed on a cart-based unit display.

Figure 9:
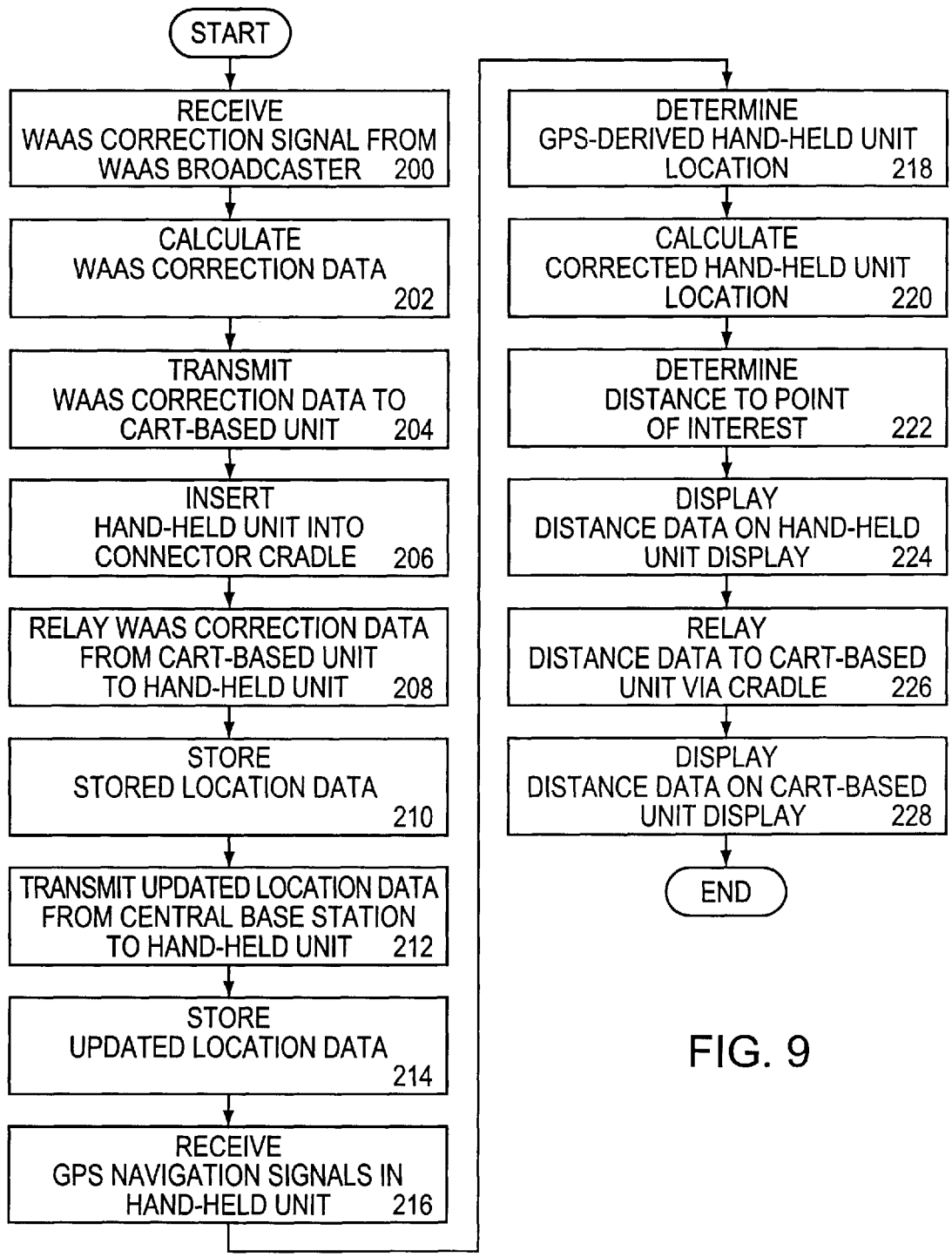
FIG. 9 is a flow diagram indicating the steps in a golf distance determination method using a WAAS receiver at a central base station according to one embodiment of the invention.

Referring now to FIG. 9, the steps in a golf distance determination method using a WAAS receiver at a central base station according to one embodiment of the invention are provided. At step 200, a WAAS correction signal from a WAAS broadcaster is received at a central base station. At step 202, a WAAS correction data is calculated from the WAAS correction signal. At step 204, the WAAS correction data is transmitted to a cart-based unit. At step 208, the WAAS correction data is relayed from the cart-based unit to the hand-held unit. At step 210, a plurality of stored location data associated with the selected points of interest on the golf course is stored. At step 212, a plurality of updated location data is transmitted from the central base station to the hand-held unit. At step 214, the updated location data is stored in memory in the hand-held unit. At step 216, a set of navigation signals from the GPS satellites is received by the hand-held unit. At step 218, a GPS-derived hand-held unit location relative to a fixed coordinate system is derived from the set of navigation signals. At step 220, a corrected hand-held unit location relative to the fixed coordinate system is calculated from a combination of the GPS-derived hand-held unit location and the WAAS correction data. At step 222, a distance data between the hand-held unit and a first point of interest on the golf course is determined by comparing the corrected hand-held unit location with the stored location data associated with the first point of interest. At step 224, the distance data is displayed on the hand-held unit display. At step 226, the distance data is relayed from the hand-held unit to the cart-based unit. At step 228, the distance data is displayed on a cart-based unit display.

Figure 10:
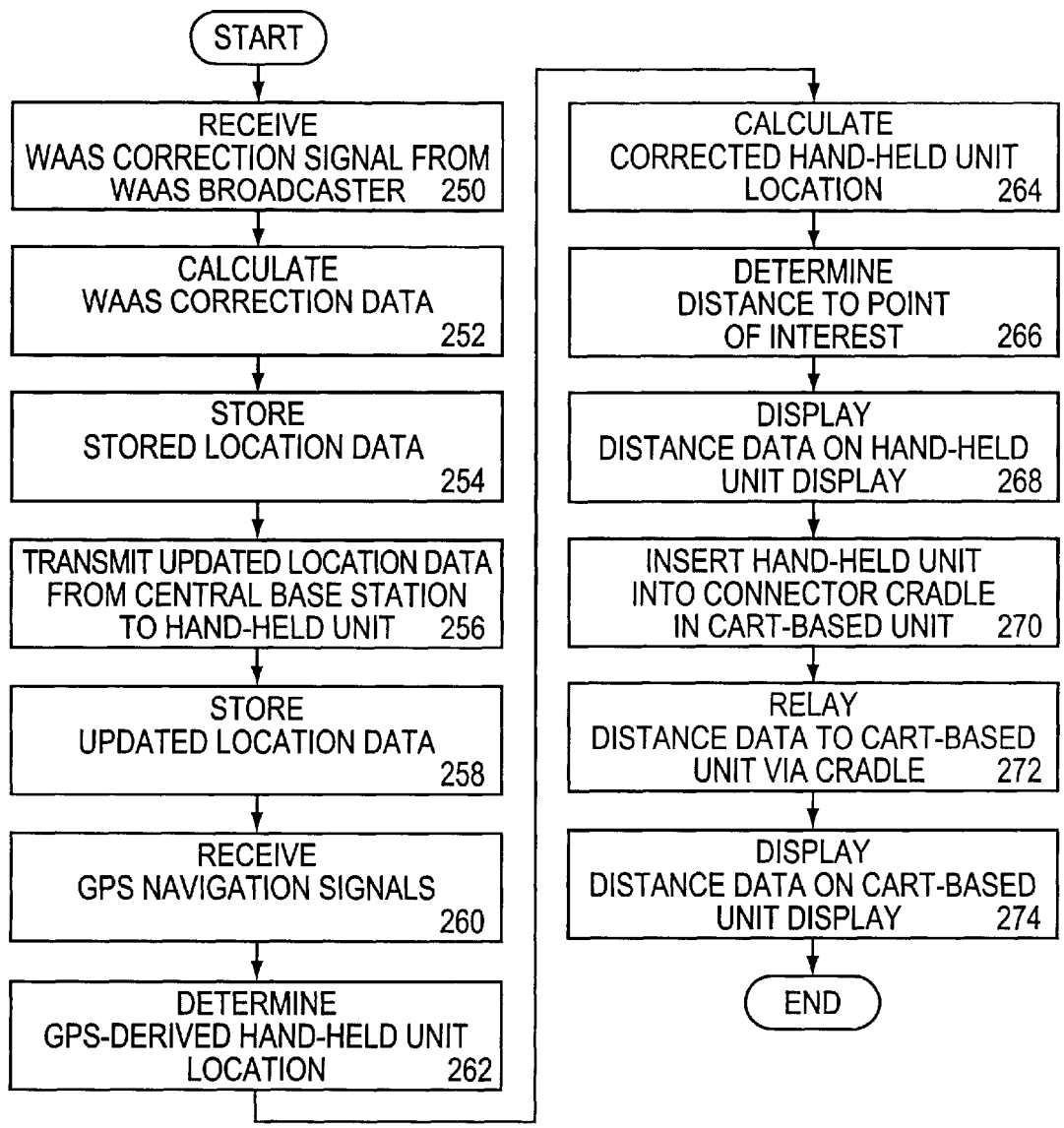
FIG. 10 is a flow diagram indicating the steps in a golf distance determination method using a WAAS receiver in a hand-held unit according to one embodiment of the invention.

Referring now to FIG. 10, the steps in a golf distance determination method using a WAAS receiver in a hand-held unit according to one embodiment of the invention are provided. At step 250, a WAAS correction signal is received from a WAAS broadcaster. At step 252, a WAAS correction data is calculated from the WAAS correction signal. At step 254, a plurality of stored location data associated with the selected points of interest on the golf course is stored. At step 256, a plurality of updated location data is transmitted from the central base station to the hand-held unit. At step 258, the updated location data is stored. At step 260, a set of navigation signals is received from the GPS satellites. At step 262, a GPS-derived hand-held unit location relative to a fixed coordinate system is determined from the set of navigation signals. At step 264, a corrected hand-held unit location relative to the fixed coordinate system is calculated from a combination of the GPS-derived hand-held unit location and the WAAS correction data. At step 266, a distance data between the hand-held unit and a first point of interest on the golf course is determined by comparing the corrected hand-held unit location with the stored location data associated with the first point of interest. At step 268, the distance data is displayed on the hand-held unit display. At step 272, the distance data is relayed from the hand-held unit to the cart-based unit. At step 274, the distance data is displayed on the cart-based unit display.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for receiving position data from GPS satellites and for determining distances to a plurality of selected points of interest on a golf course, the system comprising:

a central base station unit, the base station unit comprising:

a base station RF transceiver adapted to communicate via a wireless communications link; and a base station controller adapted to control the base station RF transceiver;

a hand-held unit, the hand-held unit comprising:
   a hand-held unit GPS receiver adapted to receive and process navigation signals from GPS satellites and to thereby provide GPS-derived hand-held unit location data;
   a hand-held unit display for displaying graphics, distance information, location information, and other information to users of the system;
   a hand-held unit memory for storing a plurality of stored location data;
   a transceiver means adapted to communicate via a wireless communications link; and
   a hand-held unit controller adapted to control the hand-held unit GPS receiver, the hand-held unit display, the hand-held unit transceiver means and the hand-held unit memory;
   wherein the hand-held unit is still further adapted to calculate a distance between the hand-held unit and a selected one of the points of interest on the golf course by comparing the hand-held unit location information with the stored location data for the selected point of interest;

a cart-based unit, the cart-based unit comprising:
   a cart-based unit battery;
   a cart-based unit RF transceiver adapted to communicate with the base station RF transceiver and the hand-held unit transceiver means via the wireless communications link;
   a cart-based unit display for displaying graphics, distance information, location information, and other information to users of the system; and
   a cart-based unit controller adapted to control the cart-based unit RF transceiver, the cart-based unit display, and communications between the cart-based unit and the hand-held unit;

wherein the base station controller is adapted to manage communication between the central base station unit and the cart-based unit.

2. The distance determining system according to claim 1 wherein the base station unit has a known base station location and wherein the base station unit further comprises:
   a base station GPS receiver adapted to receive and process navigation signals from GPS satellites and to thereby determine a GPS-derived base station location; and
   a base station processor adapted to generate a GPS correction signal that is a function of the difference between the known base station location and the GPS-derived base station location.

3. The distance determining system according to claim 2 wherein the cart-based unit is adapted to receive the GPS correction signal from the base station unit via the cart-based unit RF transceiver and to provide the GPS correction signal to the hand-held unit via the wireless communications link.

4. The distance determining system according to claim 2 wherein the hand-held unit controller is adapted to generate hand-held unit location information from a combination of the GPS-derived hand-held unit location data and the GPS correction signal.

5. The distance determining system according to claim 2 wherein the hand-held unit is adapted to receive the GPS correction signal from the cart-based unit.

6. The distance determining system according to claim 2 wherein the hand-held unit transceiver means further comprises a hand-held unit RF transceiver.

7. The distance determining system according to claim 6 wherein the hand-held unit is adapted to receive the GPS correction signal from the base station unit via the hand-held unit RF transceiver.

8. The distance determining system according to claim 7 wherein the hand-held unit controller is adapted to generate hand-held unit location information from a combination of the GPS-derived hand-held unit location data and the GPS correction signal.

9. The distance determining system according to claim 1 wherein the base station unit further comprises:
   a base station WAAS receiver adapted to receive a WAAS correction signal; and
   a base station processor adapted to determine WAAS correction data from the WAAS correction signal.

10. The distance determining system according to claim 9 wherein the cart-based unit is adapted to receive the WAAS correction data from the base station unit via the cart-based unit RF transceiver and to provide the WAAS correction data to the hand-held unit via the wireless communications link.

11. The distance determining system according to claim 9 wherein the hand-held unit controller is adapted to generate hand-held unit location information from a combination of the GPS-derived hand-held unit location data and the WAAS correction data.

12. The distance determining system according to claim 9 wherein the hand-held unit is adapted to receive the WAAS correction data from the cart-based unit.

13. The distance determining system according to claim 9 wherein the hand-held unit transceiver means further comprises a hand-held unit RF transceiver.

14. The distance determining system according to claim 13 wherein the hand-held unit is adapted to receive the WAAS correction data from the base station unit via the hand-held unit RF transceiver.

15. The distance determining system according to claim 14 wherein the hand-held unit controller is adapted to generate hand-held unit location information from a combination of the GPS-derived hand-held unit location data and the WAAS correction data.

16. The distance determining system according to claim 1 wherein the hand-held unit GPS receiver is adapted to receive a WAAS correction signal, and wherein the hand-held unit controller is adapted to determine WAAS correction data from the WAAS correction signal.

17. The distance determining system according to claim 16 wherein the hand-held unit controller is adapted to generate hand-held unit location information from a combination of the GPS-derived hand-held unit location data and the WAAS correction data.

18. A hand-held distance determining unit for use in a system for determining distances to a plurality of user selected points of interest on a golf course, the system comprising:
   a central base station unit including a base station GPS receiver, a base station processor adapted to generate a GPS correction signal, a base station RF transceiver, and a base station controller adapted to control the base station GPS receiver, the base station processor and the base station RF transceiver;
   a cart-based unit including a cart-based unit battery, a cart-based unit transceiver means, wherein the cart-based unit transceiver means includes an RF transceiver, a cart-based unit display, and a cart-based unit controller adapted to control the cart-based unit transceiver means, the cart-based unit display, and communications between the cart-based unit and the hand-held distance determining unit via the cart-based unit transceiver means, the cart-based unit being adapted to receive a GPS correction signal from the central base station unit via the cart-based unit transceiver means and to provide the GPS correction signal to the hand-held unit via the cart-based unit transceiver means;

the base station controller being adapted to manage communication of the GPS correction signal and other signals between the central base station unit and the cart-based unit;

the hand-held distance determining unit comprising:
 a hand-held unit transceiver means;
 a hand-held unit GPS receiver adapted to receive and process navigation signals from GPS satellites and to thereby provide GPS-derived hand-held unit location data;
 a hand-held unit display for displaying graphics, distance information, location information, and other information to a user of the system;
 a hand-held unit memory for storing a plurality of stored location data for the respective ones of the points of interest on the golf course; and
 a hand-held unit controller adapted to control the hand-held unit GPS receiver, the hand-held unit display, the hand-held unit transceiver means, and the hand-held unit memory;
 wherein the hand-held unit controller is adapted to generate hand-held distance determining unit location information from a combination of the GPS-derived hand-held unit location data and the GPS correction signal;
 wherein the hand-held unit is adapted to calculate a distance between the hand-held distance determining unit and a selected one of the points of interest on the golf course by comparing the hand-held distance determining unit location information with the stored location data for that respective point of interest; and
 wherein the hand-held distance determining unit is adapted to communicate with the cart-based unit via the hand-held unit transceiver means for providing the hand-held distance determining unit location information to the cart-based unit and for receiving the GPS correction signal from the cart-based unit.

19. The hand-held distance determining unit according to claim 18 wherein the hand-held unit transceiver means further comprises a hand-held unit RF transceiver adapted to communicate with the central base station unit via the base station unit RF transceiver.

20. The hand-held distance determining unit according to claim 18 wherein the hand-held distance determining unit transceiver means further comprises an infrared transceiver adapted to communicate with the cart-based unit via the cart-based unit transceiver means.

21. The hand-held distance determining unit according to claim 18 further comprising a hand-held unit input means for receiving input from a user.

22. The hand-held distance determining unit according to claim 21 wherein the hand-held unit input means comprises a touch screen.

23. The hand-held distance determining unit according to claim 21 wherein the hand-held unit input means comprises a keypad.

24. The hand-held distance determining unit according to claim 19 wherein the hand-held unit controller is adapted to receive a paging message from the central base station through the hand-held unit RF transceiver means.

25. The hand-held distance determining unit according to claim 18 further comprising a hand-held unit battery.

26. A hand-held distance determining unit for use in a system for determining distances to a plurality of user selected points of interest on a golf course, the system comprising:
 a central base station unit including a base station RF transceiver and a base station controller adapted to control the base station RF transceiver;
 a cart-based unit including a cart-based unit battery, a cart-based unit transceiver means, a cart-based unit display, and a cart-based unit controller adapted to control the cart-based unit transceiver means, the cart-based unit display, and communications between the cart-based unit and the hand-held distance determining unit;
 the hand-held distance determining unit comprising:
  a hand-held unit transceiver means;
  a hand-held unit GPS receiver adapted to receive and process navigation signals from GPS satellites and to thereby provide GPS-derived hand-held unit location data, the hand-held unit GPS receiver being further adapted to receive and process a WAAS correction signal and to generate a WAAS correction data;
  a hand-held unit display for displaying graphics, distance information, location information, and other information to a user of the system;
  a hand-held unit memory for storing a plurality of stored location data for the respective ones of the points of interest on the golf course; and
  a hand-held unit controller adapted to control the hand-held unit GPS receiver, the hand-held unit display, and the hand-held unit memory;
  wherein the hand-held unit controller is adapted to generate hand-held distance determining unit location information from a combination of the GPS-derived hand-held unit location data and the WAAS correction data;
  wherein the hand-held unit is adapted to calculate a distance between the hand-held distance determining unit and a selected one of the points of interest on the golf course by comparing the hand-held distance determining unit location information with the stored location data for that respective point of interest; and
  wherein the hand-held distance determining unit is adapted to communicate with the cart-based unit via the hand-held unit transceiver means for providing the hand-held distance determining unit location information to the cart-based unit.

27. The hand-held distance determining unit according to claim 26 wherein the hand-held distance determining unit is adapted to communicate with the cart-based unit via the hand-held unit transceiver means for receiving information from the cart-based unit, the cart-based unit being adapted to receive the information from the central base station unit via the cart-based unit transceiver means and to provide the information to the hand-held unit via the hand-held unit transceiver means.

28. The hand-held distance determining unit according to claim 26 wherein the hand-held unit transceiver means further comprises a hand-held unit RF transceiver, wherein the hand-held distance determining unit is adapted to communicate with the cart-based unit via the hand-held unit RF transceiver, and wherein the hand-held distance determining unit is further adapted to receive information from the central base station unit via the hand-held unit RF transceiver.

29. A method of determining distances to a plurality of selected points of interest on a golf course using GPS satellite position signals, the method comprising the steps of:
- determining an absolute location of a central base station relative to a fixed coordinate system;
- at the central base station, receiving a first set of navigation signals from the GPS satellites;
- determining a GPS-derived base station location relative to the fixed coordinate system from the first set of navigation signals;
- calculating a GPS correction signal that is a function of the difference between the absolute location of the central base station and the GPS-derived base station location;
- transmitting the GPS correction signal to a cart-based unit;
- relaying the GPS correction signal from the cart-based unit to a hand-held unit via a wireless communications link;
- storing a plurality of stored location data associated with the selected points of interest on the golf course;
- in the hand-held unit, receiving a second set of navigation signals from the GPS satellites;
- determining a GPS-derived hand-held unit location relative to the fixed coordinate system from the second set of navigation signals;
- calculating a corrected hand-held unit location relative to the fixed coordinate system from a combination of the GPS-derived hand-held unit location and the GPS correction signal;
- determining a distance data between the hand-held unit and a first point of interest on the golf course by comparing the corrected hand-held unit location with the stored location data associated with the first point of interest; and
- displaying the distance data on the hand-held unit display.

30. The distance determining method according to claim 29 further comprising the steps of:
- transmitting a plurality of updated location data from the central base station to the hand-held unit; and
- storing the updated location data.

31. The distance determining method according to claim 29 further comprising the steps of:
- relaying the distance data using the wireless communications link from the hand-held unit to the cart-based unit; and
- displaying the distance data on a cart-based unit display.

32. A method of determining distances to a plurality of selected points of interest on a golf course using GPS satellite position signals and WAAS correction signals, the method comprising the steps of:
- at a central base station, receiving a WAAS correction signal from a WAAS broadcaster;
- calculating a WAAS correction data from the WAAS correction signal;
- transmitting the WAAS correction data to a cart-based unit;
- relaying the WAAS correction data from the cart-based unit to the hand-held unit via a wireless communications link;
- storing a plurality of stored location data associated with the selected points of interest on the golf course;
- in the hand-held unit, receiving a set of navigation signals from the GPS satellites;
- determining a GPS-derived hand-held unit location relative to a fixed coordinate system from the set of navigation signals;
- calculating a corrected hand-held unit location relative to the fixed coordinate system from a combination of the GPS-derived hand-held unit location and the WAAS correction data;
- determining a distance data between the hand-held unit and a first point of interest on the golf course by comparing the corrected hand-held unit location with the stored location data associated with the first point of interest; and
- displaying the distance data on the hand-held unit display.

33. The distance determining method according to claim 32 further comprising the steps of:
- transmitting a plurality of updated location data from the central base station to the hand-held unit; and
- storing the updated location data.

34. The distance determining method according to claim 32 further comprising the steps of:
- relaying the distance data from the hand-held unit to the cart-based unit via the wireless communications link; and
- displaying the distance data on a cart-based unit display.

35. A method of determining distances to a plurality of selected points of interest on a golf course using GPS satellite position signals and WAAS correction signals in a hand-held unit having a hand-held unit display, the method comprising the steps of:
- receiving a WAAS correction signal from a WAAS broadcaster;
- calculating a WAAS correction data from the WAAS correction signal;
- storing a plurality of stored location data associated with the selected points of interest on the golf course;
- receiving a set of navigation signals from the GPS satellites;
- determining a GPS-derived hand-held unit location relative to a fixed coordinate system from the set of navigation signals;
- calculating a corrected hand-held unit location relative to the fixed coordinate system from a combination of the GPS-derived hand-held unit location and the WAAS correction data;
- determining a distance data between the hand-held unit and a first point of interest on the golf course by comparing the corrected hand-held unit location with the stored location data associated with the first point of interest;
- relaying the distance data from the hand-held unit to a cart-based unit via a wireless communications link; and
- displaying the distance data on a cart-based unit display.

36. A system for determining distances to a plurality of selected points of interest on a golf course using GPS position data, the system comprising:
- a central base station unit having a known base station location, the base station unit comprising:
  - a base station GPS receiver means for receiving and processing navigation signals from GPS satellites and for thereby determining a GPS-derived base station location;
  - a base station processor means for generating a GPS correction signal that is related to the difference between the known base station location and the GPS-derived base station location;

a base station RF transceiver means for communicating via a wireless communications link; and a base station controller means for controlling the base station GPS receiver means, the base station processor means and the base station RF transceiver means;

a hand-held unit comprising:

a hand-held unit GPS receiver means for receiving and processing navigation signals from GPS satellites and for thereby providing GPS-derived hand-held unit location data;

a transceiver means for communicating via a wireless communications link;

a hand-held unit display means for displaying graphics, distance information, location information, and other information to a user of the system;

a hand-held unit memory means for storing a plurality of stored location data associated respectively with the plurality of points of interest; and a hand-held unit controller means for controlling the hand-held unit GPS receiver means, the hand-held unit display means, the hand-held unit transceiver means and the hand-held unit memory means;

wherein the hand-held unit controller means is adapted to generate hand-held unit location information from a combination of the GPS-derived hand-held unit location data and the GPS correction signal; and wherein the hand-held unit is further adapted to calculate a distance between the hand-held unit and a selected one of the points of interest on the golf course by comparing the hand-held unit location information with the stored location data associated with the respective point of interest; and a cart-based unit comprising:

a cart-based unit battery means;

a cart-based unit transceiver means for communicating with the base station RF transceiver means via the wireless communications link; and a cart-based unit display means for displaying graphics, distance information, location information, and other information to a user of the system;

wherein the cart-based unit controller means is adapted to control the cart-based unit transceiver means, the cart-based unit display means, and communications between the cart-based unit and the hand-held unit via the wireless communications link;

wherein the cart-based unit is adapted to receive the GPS correction signal from the central base station unit via the cart-based unit transceiver means and to provide the GPS correction signal to the hand-held unit via the wireless communications link; and wherein the cart-based unit is adapted to receive the hand-held unit location information via the wireless communications link;

wherein the hand-held unit is adapted to communicate with the cart-based unit via the wireless communications link for providing hand-held unit location information to the cart-based unit and for receiving the GPS correction signal from the cart-based unit; and wherein the base station controller means is adapted to manage communication of the GPS correction signal between the central base station unit and the cart-based unit.

37. The distance determining system according to claim 36, wherein the cart-based unit is adapted to receive the GPS correction signal from the base station unit the cart-based unit transceiver means and to provide the GPS correction signal to the hand-held unit via the wireless communications link.

38. The distance determining system according to claim 36, wherein the hand-held unit controller means is adapted to generate hand-held unit location information from a combination of the GPS-derived hand-held unit location data and the GPS correction signal.

39. The distance determining system according to claim 36 wherein the hand-held unit is adapted to receive the GPS correction signal from the cart-based unit.

40. The distance determining system according to claim 36 wherein the hand-held unit transceiver means further comprises a hand-held unit RF transceiver means.

41. The distance determining system according to claim 40 wherein the hand-held unit is adapted to receive the GPS correction signal from the base station unit via the hand-held unit RF transceiver means.

42. The distance determining system according to claim 41 wherein the hand-held unit controller means is adapted to generate hand-held unit location information from a combination of the GPS-derived hand-held unit location data and the GPS correction signal.

43. A hand-held distance determining unit for use in a system for determining distances to a plurality of user selected points of interest on a golf course, the hand-held distance determining unit comprising:

a hand-held unit GPS receiver adapted to receive and process navigation signals from GPS satellites and to thereby provide GPS-derived hand-held unit location data, the hand-held unit GPS receiver being further adapted to receive and process a WAAS correction signal and to generate a WAAS correction data;

a hand-held unit display for displaying graphics, distance information, location information, or other information to a user of the system;

a hand-held unit memory for storing a plurality of stored location data for the respective ones of the points of interest on the golf course;

a hand-held unit transceiver;

a hand-held unit controller adapted to control the hand-held unit GPS receiver, the hand-held unit display, the hand-held unit memory, and the hand-held transceiver;

wherein the hand-held unit controller is adapted to generate hand-held distance determining unit location information from a combination of the GPS-derived hand-held unit location data and the WAAS correction data; and wherein the hand-held unit is adapted to calculate a distance between the hand-held distance determining unit and a selected one of the points of interest on the golf course by comparing the hand-held distance determining unit location information with the stored location data for that respective point of interest.

44. The hand-held distance determining unit according to claim 43, wherein the hand-held unit transceiver comprises of an infrared transceiver means.

45. The hand-held distance determining unit according to claim 43, wherein the hand-held unit transceiver comprises a RF transceiver means.

46. The hand-held distance determining unit according to claim 43, wherein the hand-held unit transceiver comprises a hand-held unit RF transceiver for communicating with a central base station unit via a base station unit RF transceiver.

* * * * *